US012784013B2

(12) United States Patent
Povsner et al.

(10) Patent No.: US 12,784,013 B2
(45) Date of Patent: Nov. 3, 2026

(54) CENTRALIZED TRACKING FOR DIGITAL CURRENCIES

(71) Applicant: NATIONAL CURRENCY TECHNOLOGIES, INC., Ashburn, VA (US)

(72) Inventors: Joshua M. Povsner, Ashburn, VA (US); Duncan Parker, Richmond, VA (US)

(73) Assignee: NATIONAL CURRENCY TECHNOLOGIES, INC., Ashburn, VA (US)

( * ) Notice: Subject to any disclaimer, the term of this patent is extended or adjusted under 35 U.S.C. 154(b) by 155 days.

(21) Appl. No.: 18/272,689

(22) PCT Filed: Feb. 9, 2022

(86) PCT No.: PCT/US2022/015856
§ 371 (c)(1),
(2) Date: Jul. 17, 2023

(87) PCT Pub. No.: WO2022/173857
PCT Pub. Date: Aug. 18, 2022

(65) Prior Publication Data
US 2024/0037517 A1 Feb. 1, 2024

Related U.S. Application Data

(60) Provisional application No. 63/148,335, filed on Feb. 11, 2021, provisional application No. 63/173,631,
(Continued)

(51) Int. Cl.
*G06Q 20/06* (2012.01)
*G06Q 20/38* (2012.01)

(52) U.S. Cl.
CPC ....... *G06Q 20/0655* (2013.01); *G06Q 20/382* (2013.01); *G06Q 20/389* (2013.01); *G06Q 2220/10* (2013.01)

(58) Field of Classification Search
None
See application file for complete search history.

(56) References Cited

U.S. PATENT DOCUMENTS

2002/0082997 A1 6/2002 Kobata et al.
2006/0136747 A1* 6/2006 Ahdout ................ G06Q 20/123 713/189
(Continued)

OTHER PUBLICATIONS

Zhu, Yan, et al. "Digital asset management with distributed permission over blockchain and attribute-based access control." 2018 IEEE International Conference on Services Computing (SCC). IEEE, 2018. (Year: 2018).*
(Continued)

*Primary Examiner* — Jason B Dunham
*Assistant Examiner* — Brock E Turk
(74) *Attorney, Agent, or Firm* — VOLENTINE, WHITT & FRANCOS, PLLC

(57) ABSTRACT

A central system may track virtual notes of a digital currency involved in transactions so that current ownership of the virtual notes can be verified as a basis for authorizing transactions involving the virtual notes. The central system may create and maintain an electronic history for the virtual notes, and update the electronic history after each transaction.

15 Claims, 12 Drawing Sheets

Related U.S. Application Data filed on Apr. 12, 2021, provisional application No. 63/209,989, filed on Jun. 12, 2021, provisional application No. 63/240,964, filed on Sep. 5, 2021, provisional application No. 63/294,732, filed on Dec. 29, 2021, provisional application No. 63/304,684, filed on Jan. 30, 2022.

(56) References Cited

U.S. PATENT DOCUMENTS

| | | | | |
|---|---|---|---|---|
| 2010/0191656 | A1 | 7/2010 | Martin et al. | |
| 2011/0302303 | A1 | 12/2011 | Dunkeld et al. | |
| 2012/0057591 | A1* | 3/2012 | Erman | H04L 67/1095 370/503 |
| 2015/0170112 | A1 | 6/2015 | DeCastro | |
| 2017/0206523 | A1 | 7/2017 | Goeringer et al. | |
| 2017/0317833 | A1 | 11/2017 | Smith et al. | |
| 2019/0197805 | A1* | 6/2019 | Meadow | G01S 5/0294 |
| 2019/0279204 | A1* | 9/2019 | Norton | G06Q 30/018 |
| 2020/0153793 | A1* | 5/2020 | Kikinis | H04L 63/101 |
| 2023/0042916 | A1* | 2/2023 | Sole | G06Q 20/123 |

OTHER PUBLICATIONS

Hamza, Ahamed, and Mohammed Ayyoob. Securing IoT networks using formal behavioral modeling and dynamic flow management. Diss. UNSW Sydney, 2020. (Year: 2020).*

International Search Report and Written Opinion, dated May 31, 2022, for PCT No. PCT/US2022/015856, 15 pgs.

* cited by examiner

| Group1 | Group2 | Group3 | Group4 | Group5 | Group6 | Group7 | Group8 | Group9 |
|---|---|---|---|---|---|---|---|---|
| AS1 | AS1 | AS1 | AS1 | AS1 | AS1 | AS1 | AS1 | AS1 |
| AS2 | AS2 | AS2 | AS2 | AS2 | AS2 | AS2 | AS2 | AS2 |
| AS3 | AS3 | AS3 | AS3 | AS3 | AS3 | AS3 | AS3 | AS3 |
| AS4 | AS4 | AS4 | AS4 | AS4 | AS4 | AS4 | AS4 | AS4 |
| AS5 | AS5 | AS5 | AS5 | AS5 | AS5 | AS5 | AS5 | AS5 |
| AS6 | AS6 | AS6 | AS6 | AS6 | AS6 | AS6 | AS6 | AS6 |
| AS7 | AS7 | AS7 | AS7 | AS7 | AS7 | AS7 | AS7 | AS7 |
| AS8 | AS8 | AS8 | AS8 | AS8 | AS8 | AS8 | AS8 | AS8 |

5561

161561

| Bay 1 | Bay 2 | Bay 3 | Bay 4 | Bay 5 | Bay 6 | Bay 7 | Bay 8 | Bay 9 |
|---|---|---|---|---|---|---|---|---|
| AS1 | AS1 | AS1 | AS1 | AS1 | AS1 | AS1 | AS1 | AS1 |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| AS40K | AS40K | AS40K | AS40K | AS40K | AS40K | AS40K | AS40K | AS40K |
| ... | ... | ... | ... | ... | ... | ... | ... | ... |
| AS50K | AS50K | AS50K | AS50K | AS50K | AS50K | AS50K | AS50K | AS50K |

FIGURE 6D
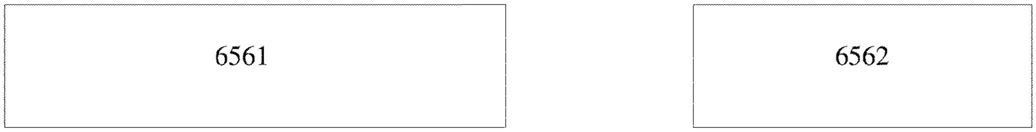
FIGURE 6E
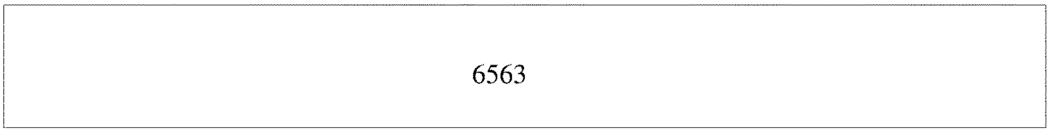
FIGURE 6F
| Header 24 | | | VN Count 8 | VN Origin ID 8 | First Party ID 8 | Second Party ID 8 | VN #1 ID 8 |
|---|---|---|---|---|---|---|---|
| VN#2 ID 8 | VN #3 ID 8 | VN #4 ID 8 | VN #5 ID 8 | VN#6 ID 8 | VN #7 ID 8 | VN #8 ID 8 | VN #9 ID 8 |
| VN #10- ID 8 | VN #11- ID 8 | VN #11- ID 8 | VN #13- ID 8 | VN #14- ID 8 | VN #15- ID 8 | VN #16- ID 8 | SFIOI Type 8 |
| . . . | | | | | | | |
| Reserved 64 | | | | | | | |

CENTRALIZED TRACKING FOR DIGITAL CURRENCIES

CROSS REFERENCE TO RELATED APPLICATIONS

This patent application claims priority to U.S. provisional application No. 63/148,335, filed Feb. 11, 2021, to U.S. provisional application No. 63/173,631, filed Apr. 12, 2021, to U.S. provisional application No. 63/209,989, filed Jun. 12, 2021, to U.S. provisional application No. 63/240,964, filed Sep. 5, 2021, to U.S. provisional application No. 63/294,732, filed Dec. 29, 2021, and to U.S. provisional application No. 63/304,684, filed Jan. 30, 2022, which are all herby incorporated by reference in their entireties.

BACKGROUND

National digital currencies (NDCs) are potentially useful to supplement or replace national physical currencies. Distributed ledger technology (DLT) has been studied in this context. DLT provides a consensus network in which copies of a ledger are maintained and updated at each independent node of the consensus network. When a question is raised as to a transaction, a consensus among the nodes decides the answer to the question. For a variety of reasons such as efficiency, DLT is not particularly appropriate for use in implementing NDCs. The inventor(s) of the subject matter described in this and related applications have therefore investigated how to realistically efficiently implement NDCs with centralized tracking.

BRIEF DESCRIPTION OF THE DRAWINGS

Example embodiments are best understood from the following detailed description when read in context with the accompanying drawing figures, in which:

FIG. 6D illustrates another memory arrangement for a SGS that processes a received instruction or inquiry; FIG. 6E illustrates another memory arrangement for a SGS that processes a received instruction or inquiry; FIG. 6F illustrates an example format for a SFIOI.

DETAILED DESCRIPTION

In the following detailed description, for purposes of explanation and not limitation, representative embodiments disclosing specific details are set forth in order to provide a thorough understanding of the representative embodiments according to the present teachings. However, other embodiments consistent with the present disclosure may depart from specific details disclosed herein. Descriptions of known systems, devices, methods of operation and methods of manufacture may be omitted so as to avoid obscuring the description of the representative embodiments. Nonetheless, systems, devices and methods that are within the purview of one of ordinary skill in one or more of the numerous arts relevant to the present teachings are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

If centralized tracking is to be used to implement NDCs, numerous efficiency aspects must be addressed. A CS for tracking an NDC must interface with the public, and for efficiency purposes should only accept one or very few predefined format(s) for incoming communications. Since the public may include any individual anywhere in the world connected to the internet, the CS must be accessible with minimal complexity while also being maintained safe. Inquiries and instructions to a CS may be provided as a short, formatted inquiry or instruction (SFIOI) which require minimal information including at least a unique identification of each virtual note (VN) specified in the SFIOI and a unique identification for each party involved in whatever is communicated in the SFIOI. Centralized tracking for NDCs may provide benefits such as the ability to proactively and authoritatively confirm ownership of VNs even in the absence of transactions or transfers, and the ability to cooperate with courts, law enforcement and security agencies such as to freeze transfers of VNs based on, for example, court orders.

After creation, a VN may be initially assigned to a financial institution by a CS, and then transferred between different parties before being provided back to the CS for retirement. VNs and SFIOIs may be packetized and communicated over packet-switched networks that switch packets in accordance with transmission control protocol/internet protocol (TCP-IP) and/or user datagram protocol (UDP-IP).

Figure 1A:
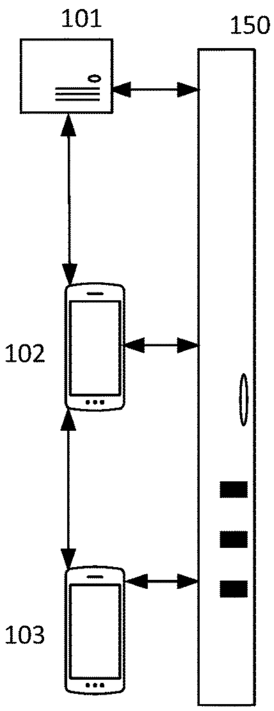
FIG. 1A illustrates tracking virtual notes (VNs) of NDCs.

In tracking virtual notes (VNs) of NDCs shown in FIG. 1A, transaction requesters and/or transaction counterparties send SFIOIs to an internet protocol (IP) address of the CS 150 to inquire as to ownership of VNs or to provide instructions to transfer ownership of VNs. In some embodiments, first ECDs (electronic communication devices) used by parties may initiate transactions with second ECDs used by other parties and may send VN information (VN_info) to the second ECDs. The second ECDs may initiate inquiries to the CS 150 and send the VN_info to the CS 150. In some embodiments, transaction counterparties may proactively verify with the CS 150 that a transaction requester is the owner of a VN without the CS confirming with the transaction requester that the VN will be transferred, such as if transaction requesters provide verification information to the transaction counterparties uniquely identifying the transaction requesters. The counterparties may present the verification information to the CS 150 so that the CS 150 can assume that the transaction requesters have assented to transfer the VN since there is a very low risk that a counterparty can guess that any particular party is the owner of record for any particular VN.

In some embodiments, the transaction requester may provide an encrypted unique identification to the counterparty for the counterparty to check with the CS 150. Once the transaction requester confirms the transaction, the counterparty will obtain the unencrypted unique identification that uniquely identifies the VN. the transaction requesters may provide verification information uniquely identifying the transaction requesters. The counterparties may present the verification information to the CS 150 so that the CS 150 can assume that the transaction requesters have assented to transfer the VN. In these embodiments, counterparties proactively confirm validity of the VN and ownership of the VN by the transaction requesters by sending the verification information of the transaction requesters and the VN_info directly to the CS 150.

In some embodiments, transaction requesters may proactively notify a CS that VNs will be transferred.

In some embodiments, an executable program may be embedded within a VN. The executable program may be configured to initiate SFIOIs with the CS 150 periodically and/or when an internet connection is available after being unavailable, so as to initiate a report of the current location of the VN. Metadata may be sent to the CS 150 to update the electronic records at the CS 150 as a check-in process not initiated by a party. The metadata may include records of offline transactions involving the VN, such as transactions using near field communications (NFC).

Unique identifications for parties may be specified in as few as 5 bytes. Identification of the nations issuing the unique identifications may be built into the unique identifications, so that unique identifications may be used for different CS s. Unique identifications for VNs may be specified in four bytes or five bytes. Five bytes may be used to specify up to almost 1.1 trillion unique IDs for VNs, and four bits (e.g., the first four bits) of the five full bytes may be used to specify any of up to sixteen denominations for VNs with the remaining thirty six bits specifying almost 69 billion different unique IDs for VNs of any particular denomination.

SFIOIs may be strictly formatted for any particular CS, but may vary for different CS s. Since a typical packet size in some forms of communications is 512 bytes, and a minimum page size in flash memory is also 512 bytes, a logical format for a SFIOI to a CS 150 may require exactly 512 bytes. Fractions (e.g., 256) or multiples (e.g., 1024) of 512 bytes may also be logical choices for a format size in terms of processing and storage efficiency. Unique identifications for parties and unique identifications for VNs specified in the SFIOIs may be allocated full 64-bit words (or more). The number of VNs that may be specified in any SFIOI may be limited to, for example 7 or 9. SFIOIs may also specify the actual number of VNs specified in the SFIOIs, a type of the SFIOI, and so on. Since most or perhaps all of the data provided in different fields for a format for an SFIOI can be specified in fewer than 64 bits, the format for a SFIOI may specify that the data is to begin at the first bit of the field or is to end at the last bit of the field, so that either the end of the field or the beginning of the field has bits set as zero (0). Fields in a SFIOI may also be provided for unique identifications of currency reader programs (CRPs) and electronic wallet programs (EWPs) that handle the VNs. Approved CRPs and EWPs may operate in accordance with the expected format(s) for SFIOIs, so that they do not send SFIOIs that do not comply with the expected format(s). An example SFIOI format is shown in and described with respect to FIG. 6F.

Figure 1B:
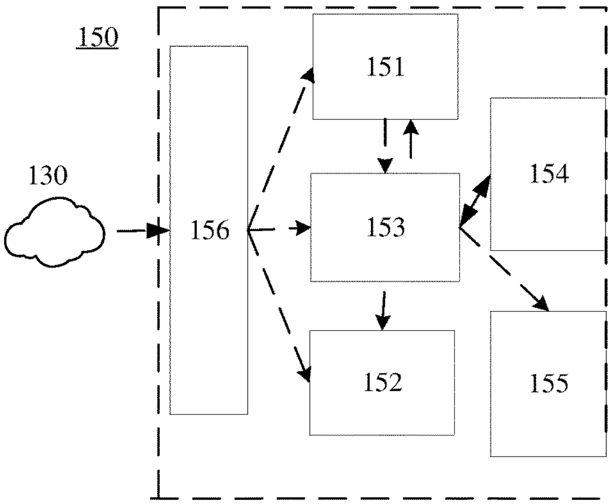
FIG. 1B illustrates a functional network layout for a central system (CS)

In the functional network layout for a CS in FIG. 1B, a SGS 156 interfaces with the public. The SGS 156 is used as the interface with the public for the CS 150. The CS 150 includes the SGS 156, an ID management system 151 (identification management system), a LSS 152 (ledger storage system), a MMS 153 (main memory system), an artificial intelligence and analytics system 154, and a backup memory system 155. The arrows in FIG. 1B show that in some cases, communications between elements of the CS 150 may be mostly or entirely restricted to one-way communications. In FIG. 1B, the SGS 156 is used as an interface between the public and other elements of the CS 150. The arrows in FIG. 1B show that in some cases, communications between elements of the CS 150 may be mostly or entirely restricted to one-way communications. Additionally, as should be clear, in embodiments based on FIG. 1B, any and all communications from at least the public may be restricted to the SGS 156. As described herein, many types of security concerns for implementing a CS 150 can be addressed by properly managing electronic communications from the very beginning. The SGS 156 may control destination systems reachable at internet protocol addresses published to the public, and otherwise limit any access to the other elements of the CS 150 so that there is no direct access whatsoever to the other elements though properly formatted SFIOIs may be passed through. Communications that do not meet specific formats and/or standards may be simply discarded, as the voluminous interactions required of a CS 150 must be fast and efficient, so that no exceptions are made since exceptions may interrupt speed and efficiency and present constant security risks. The ID management system 151 may be used to store and update records for parties authorized to use the NDC tracked by the CS 150. Identities may be standardized worldwide for multiple CSs including the CS 150. The party identifications may be formatted to explicitly or implicitly specify which nation or region is the source of each party identification. Fields of a party identification may be dedicated to identifying states/regions of a nation, ID types (e.g., for bank-issued IDs, national IDs, social media IDs, and the ID number itself. Additionally, the United States has approximately 5200 banks or similar entities. Identifications for banks and similar entities which handle VNs may be assigned using 16 bits. Unique party identifications may also be obtained through banks or similar entities. For example, the first 13 bits of a party identification may be an identification for a bank or similar entity through which the party identification was obtained. One benefit of implementing party identifications this way is that a profile managed by a CS may limit information of parties, since the banks and similar entities have records specifically identifying their customers, so that the identification of the end users may be retained by the banks or similar entities without requiring a complete profile to be managed by the CS 150. The ID management system 151 stores or is configured to store identification numbers for parties, and at least some of the identification numbers may be generated by third-party systems (e.g., for banks) for parties who are anonymous to the CS 150. Unbanked individuals may obtain unique identifications for using VNs via local branches of national postal services, such as via digital fingerprint pads which can be used by any individual with a finger to uniquely identify themself.

The LSS 152 is used to maintain records of current ownership of all VNs issued through the CS 150. The LSS 152 is used to address ownership inquiries from the public via the SGS 156. The LSS 152 is updated from the MMS 153 when VNs are transferred via SFIOIs. The LSS 152 may be effectively isolated from other elements of the CS 150. Inquiries in SFIOIs may be provided from the SGS 156 via first dedicated communication channels (e.g., dedicated wired connections), and updates from the MMS 153 may be provided via second dedicated communication channels (e.g., dedicated wired connections). The LSS 152 may be used to quickly track and verify ownership of a VN by hierarchically storing records for VNs in a alphabetical order, a numerical order, or an alphanumeric order. In this way, a record for a VN can be looked up using the unique identification of the VN. Using the LSS 152, the CS 150 is configured to proactively confirm ownership of instances of a tracked digital asset (e.g., the VNS of the NDC) based on inquiries in the packets of the SFOIs, and this may be done without transferring ownership of the tracked digital asset. The ability to proactively confirm or deny ownership of an instance of a tracked digital asset is an advantage provided by the CS 150.

The MMS 153 is used to store most or all types of records for the NDC, and may be distributed by type. In the context of any tracked digital asset including VNs of an NDS, the MMS 153 stores or is configured to store records of all instances of the tracked digital asset The MMS stores records for all instances of a tracked digital asset (e.g., the VNs of the NDC) for the CS 150. The MMS 153 receives updates to the records from the SGS 156 once instructions in a SFIOI packet pass processing by algorithms of complex software run by the SGS 156.

The ID management system 151 may send updates to the MMS 153 when an identification is updated, such as when an individual changes name, dies, retires a previous identification and obtains a new one, and so on. The SGS 156 may send ownership updates to the MMS 153.

The artificial intelligence and analytics system 154 may be provided access only to the MMS 153, and entirely closed off from the public.

The backup memory system 155 may also be entirely closed off from the public in normal operations, though if the backup memory system 155 is switching on, functionality of the main record system 153 *s* may instead be switched to the backup memory system 155.

The SGS 156 may include servers assigned to handle incoming communications addressed to designated internet protocol (IP) addresses. The SGS 156 serves a function of shielding the MMS 153 and the other elements of the CS 150 from the public. The SGS 156 is a security system that executes complex software that systematically performs comprehensive checks on SFIOIs received at the CS 150. The software may include a set of sub-applications which may be adapted to any of a variety of formats set for SFIOIs used in any CS identical or similar to those described herein. Each of the software sub-applications performs a different task or different tasks then other of the software sub-applications. A first set of algorithms of the complex software at the SGS 156 may send inquiries outside of the SGS 156 but within the CS 150, and a second set of algorithms of the complex software at the SGS 156 check for responses to the inquiries sent outside of the SGS 156. No sub-application or core of a multi-core processor executes or processes the entirety of any SFIOI, and instead the sub-applications process different parts of each SFIOI.

The sub-applications may perform security checks, such as for compliance with a required format for SFIOIs. One sub-application may check one field to ensure that the source ID for a VN corresponds to the provider of the SGS 156. Other software sub-applications may be dedicated to coordinating checks with other elements of the CS 150, including the LSS 152 (confirming that VNs specified in a SFIOI belong to an owner specified in the SFIOI), with the ID management system 151 or another element (e.g., to check for owner-specific handling instructions), with the MMS 153 (e.g., to check greylists and blacklists for owners and VNs specified in a SFIOI) and so on. Proof of knowledge of ownership of each VN specified in each SFIOI may be a key safety measure, even though avoiding hang-ups waiting for a response from the LSS 152 or similar responses for similar inquiries to other elements of the CS 150 may be the key reason, or one of the key reasons, that all processes for SFIOIs are not implemented linearly by stand-alone cores of a multi-core processor. The software sub-applications may be provided as a software program, or as pre-programmed special-purpose multi-core processors that implement the software program, or as dedicated computers (e.g., servers) with one or more such multi-core processors programmed to implement the software program.

The SGS 156 may check to ensure that null fields of SFIOIs are null, that header information such as a hop count is exactly what is expected (e.g., 0), and so on. The sub-applications may run on the SFIOIs stored in the pages in a FIFO sequence. Each sub-application performs its assigned type of safety process in the same manner on each SFIOI it is authorized to process. Different sub-applications perform different types of checks. Processing for each page is highly coordinated by staggering the sub-applications to run in a predetermined order on each memory page until all sub-applications are finished with their processing of the SFIOI on the memory page.

The SGS 156 may include multiple nodes, and every node may be able to process tens of thousands (e.g., 40,000 or more) of legitimate SFIOIs per minute. Incoming SFIOIs may be stored at sequential address spaces of 512 bytes (i.e., flash memory pages which serve as uniform memory units). The last few words (e.g., 8 words) in each 64-word SFIOI may be formatted to be null and are not written to the page.

The processing at the SGS 156 may be visualized as 4-dimensional processing. The 512-byte pages are 2-dimensional memories with 64 64-bit word lines. Each sub-application incrementally moves between pages in a third dimension and processes the same byte(s) or word(s) on each page. The sub-applications are staggered in time as a fourth dimension, so that sub-applications avoid collisions trying to read from or write to the same byte(s) or word(s) at the same time. Additionally, the ownership checks and other types of external checks for the sub-applications necessarily involve a timing offset as one set of cores sends pairs to the LSS 152, and another set of cores processes the responses from the LSS 152 to avoid any core sending a pair and then being hung up waiting for a response.

A status update system of the SGS 156 may use the same memory pages as are used for storing the SFIOIs. The status update system is used to synchronize the sub-applications as they process the SFIOIs. By way of explanation, any form of tracking for a NDC may require enormous numbers of write cycles to the memory pages used to store the SFIOIs. If the same memory cells, or even the same type of memory cells, are used to update statuses 10 to 20 times during processing of each SFIOI, the number of write cycles to the status memory cells would be many times the number of write cycles to the memory cells used for storing the SFIOI, and this would result in the overall memory being fatigued much quicker when the status memory cells become fatigued. To address this, for example, 8 64-bit (8 byte) processing words at the end of the 512-byte SFIOIs may be mandatorily null, not written to the memory page, and the corresponding memory cells may be used for status updates instead of any substantive data in the SFIOIs. The SFIOIs may be stored on a 1-to-1 basis on 512-byte pages at the SGS 156, but without writing the 8 64-bit null processing words at the end of the SFIOIs to the pages. Instead, the memory cells at the end of the memory pages may be used for tracking statuses of the sub-applications so that the sub-applications can check the appropriate status word/byte before performing their processes on SFIOIs, and can each update a different status word/byte after performing their processes. The memory cells used for the status updates may be written at effectively the same rate as the memory cells used for storing the substantive data of the SFIOIs, and this may extend the memory life by at least 1000%.

A 24-core/48-thread (e.g., AMD) processor is an example of the type of multi-core processor appropriate for the SGS 156, so 8 processing words (64 bytes) provide more than enough bytes to dedicate on a 1-1 or better basis for each thread to update when the process implemented for the SFIOI by the thread is complete. Pairs of multi-core processors and flash memories may be rotated in and out of service in groups at the SGS 156. Each sub-application may check (read from) one assigned status field to ensure the sub-application is cleared to process an SFIOI before proceeding, and may update (write to) at least one different status field(s) upon completing the processing, so that the next sub-application(s) can check the update before performing its safety process on the SFIOI. After performing a safety check, the sub-applications may mark appropriate status fields for each 512-byte page or sector before proceeding, to notify successive sub-applications whether they should perform their processing. For example, if any sub-application detects an error in any SFIOI, the sub-application may update the status of all update bytes in the status field to show that no more processing is needed by any sub-application for the SFIOI on the page. This can be done by simply indicating that all necessary processing has already been performed so that successive sub-applications skip the SFIOIs in which an error is detected.

Some of the sub-applications may generate inquiries to external systems within the CS 150 (i.e., external to the SGS 156), and it would be inefficient to have any processing resource pause while waiting for answers to inquiries. For example, since verifications of ownership may be performed by sending inquiries as SFIOIs to the LSS 152 and receiving confirmations or denials of ownership from the LSS 152, the inquiries may be sent by one set of threads and responses may be checked by another set of threads to avoid hang-ups. This may avoid any particular thread accumulating latency delays while awaiting responses. As an example, ownership checks may require up to 18 threads total when each SFIOI may specify up to 9 virtual notes.

Communications within the CS 150 may use internal addressing so that an outside party may not be able to determine how a SGS 156 obtains information from the LSS 152 or the ID management system 151. The only element of the CS 150 assigned any IP address may be the SGS 156.

In some embodiments, 48 threads may be run simultaneously by different cores of the example 24-core processor to process SFIOIs. The SGS 156 may run 24/7/365 by switching in and out different pairs of multi-core processors and flash memories.

In some embodiments, different NDCs may be exchanged in a currency exchange, such as by a first CS and a second CS which communicate with each other. Each CS may receive information of VNs and purported owners to confirm with counterpart CSs that the VNs are owned by the purported owners. Accordingly, CSs may accept inquiries for VNs that they do not manage or track, as long as the VNs are managed or tracked by counterpart CSs. In some similar embodiments, the CSs may directly exchange VNs, such as to settle trade flows. Also or alternatively, custodial institutions may provide currency exchange services for VNs and assist one or more CSs in tracking different types of VNs.

SFIOIs may also specify amounts of change due to a sender of VNs. In the example of the currency exchange processes, CSs for multiple different digital currencies may facilitate change when they are used to exchange VNs of the different digital currencies.

Notifications may be provided to communications addresses of record for the owners of record as an anti-spoofing mechanism. Use of a multi-factor push service similar to AuthPoint may be required for users of approved CRPs or EWPs. In some embodiments, a service similar to AuthPoint may be used to implement multi-factor authentication for multiple applications and programs on electronic user devices, so that push notifications for the same service may be used to confirm VN transfers, transaction initiations, VPN log-ins, and/or other types of actions for which multi-factor authentication may be appropriate. In some embodiments, multi-factor authentication may include dynamically generating a code such as a set of 2 characters, and sending the code or characters to a predetermined communication address such as a telephone number for the actual owner of the VNs. The actual owner may be required to type in the 2 characters in a response confirming the transfer.

Instances of authorized CRPs and/or EWPs used for transactions involving VNs may be provided with unique identifications maintained in association with unique identifications of parties in records at the CS 150. A CRP is a program that is configured to read and properly interpret the file of a VN. An EWP is a program that provides access to one or more accounts under which a VN may be stored and transacted, and may be configured to read and properly interpret the file of a VN. In some embodiments, authorized CRPs and EWPs may be centrally controlled. For example, the CS 150 may coordinate with application servers of third-party service providers that provide the authorized CRPs and EWPs, so that parties using VNs can be automatically updated as to where to send SFIOIs. The CRPs and EWPs may include instructions to halt transactions and transfers at the same time each day, each week, each month, or each year. The CRPs and EWPs may also each include a subprogram that is activated by a signal sent from the CS, so as to be dynamically halted such as for urgent or emergency reasons. The CRPs and EWPs may be halted for set time periods, or until a notification is received from the CS 1350 to resume. The synchronization may also be provided for all CRPs and EWPs, subsets of CRPs and EWPs, or individual CRPs and EWPs.

Verification information for parties may include one or more forms of verification information which may uniquely identify parties such as unique communication addresses, unique identifications of program instantiations of programs used by the parties, unique account numbers of accounts assigned to the parties, unique device identifications of ECDs used by the parties, unique personal identifications assigned to the parties by governments, biometric information, and other forms of unique information that may be uniquely correlated to parties. In some embodiments, parties may be enabled to select which form of verification information will be used to confirm ownership by the parties, and the parties may also be enabled to change the form of verification information associated with their ownership of VNs.

Movement of VNs of NDCs may be detected and reported in a variety of ways. Primarily, movement of VNs will be detected and reported by programs involved in transferring the VNs, such as CRPs or EWPs. However, a VN may also or alternatively include an executable software subroutine of instructions that is retrieved from the VN whenever metadata is extracted, such as to generate VN_info. Executable software subroutines may be included in a specific field of a VN, such as in a metadata field or a separate instruction field. The executable software subroutine may be provided in duplicated forms in multiple software languages so that the VN can be processed by different computers using different types of operating systems. When the executable software subroutine is retrieved and processed, such as to generate the VN_info, the executable software routine may recognize that the VN is being moved or has moved, and the executable software subroutine may initiate a message to report the movement over an electronic communications network to the CS 150. The message may be sent to a predetermined hostname or IP address, and may report that the VN is being moved from one account to another account.

Figure 1C:
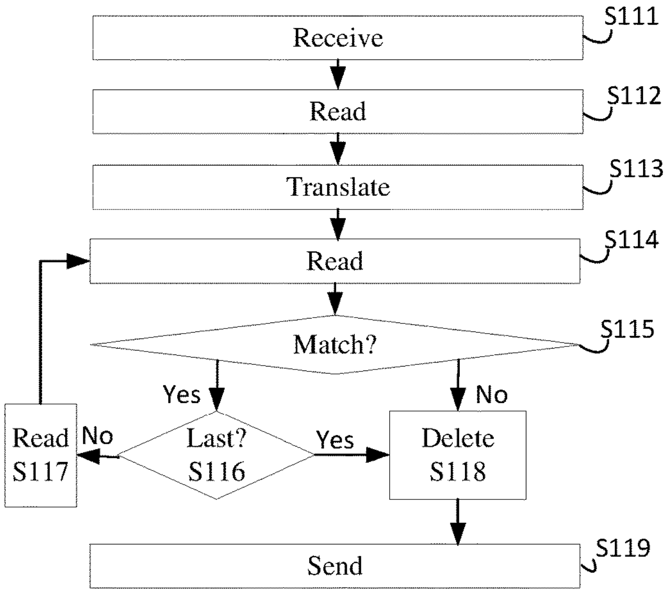
FIG. 1C illustrates a method for a CS to handle communications for batches of VNs and translatable party information.

In the method for a CS to handle communications for batches of VNs and translatable party information in FIG. 1C, at S111 a CS receives a SFIOI, such as an ownership inquiry or a transfer instructions. The CS 150 receives or is configured to receive updates to the records for VNs from the SGS 156 once instructions from the public pass processing by one or a plurality of algorithms that perform security checks at the security gateway system. At S112, the CS reads a batch count, sender information and counterparty information, and VN information. The batch count may specify how many VN information fields are populated in the communication. The sender information and counterparty information may be unique identifications of a universal type used by the CS, or of other types that can be translated into a universal type used by the CS. At S113, the CS translates the sender and/or counterparty information, if necessary. At S114, the CS reads the VN info. At S115, the CS uses the LSS 152 to determine whether the VN information matches the current ownership indicated in the SFIOI. If the VN information matches the current ownership indicated in the SFIOI (S115=Yes), at S116 the CS determines whether the VN information is for the last VN specified in the communication. If the VN is not the last VN specified in the communication (S115=No), the CS reads the next VN information at S117 and returns to S114. If the VN is not the last VN specified in the communication (S116=No), the CS deletes the communication at S118 and sends the response to the inquirer or instructor at S119. Also, if the CS determines at any time that VN information does not match current ownership indicated in the communication (S115=No), the CS deletes the communication at S118 and sends the response to the inquirer or instructor at S119.

In some embodiments, part or all of one or more files in a folder or application for a VN may comprise a lightweight database. The lightweight database may be activated by a triggering event such as a transfer of the VN or an automated report to the CS 150, such as to check in via an SFIOI with an update for current location. The lightweight database may include data in JSON format on a file within the application so that the data can be read by multiple different types of devices.

If a VN is lost, such as when a portable memory is lost, an owner may be provided an ability to present ownership credentials to the CS 150. The CS 150 may cancel the VN and any other VNs registered with the owner, and simply issue new VNs to the owner with the same denomination.

An electronic history for VNs may be maintained at the MMS 153. The electronic history may start with the unique identification and date/time of creation for the VN, and may be populated with the date and identification that identifies each party that owns the VN as the VN changes hands in transactions. For example, the electronic history may include a date, time and location of creation, a sequential list of each owner of the VN, identifying information of each owner, and a date or date/time combination for each transaction in which the VN is transferred between owners. The electronic history may be created and updated for each VN of a set of VNs of a NDC, such as VNs denominated at or above specified amounts. For example, records for VNs with value of $1000 may be updated each time the VNs are transacted.

Figure 1D:
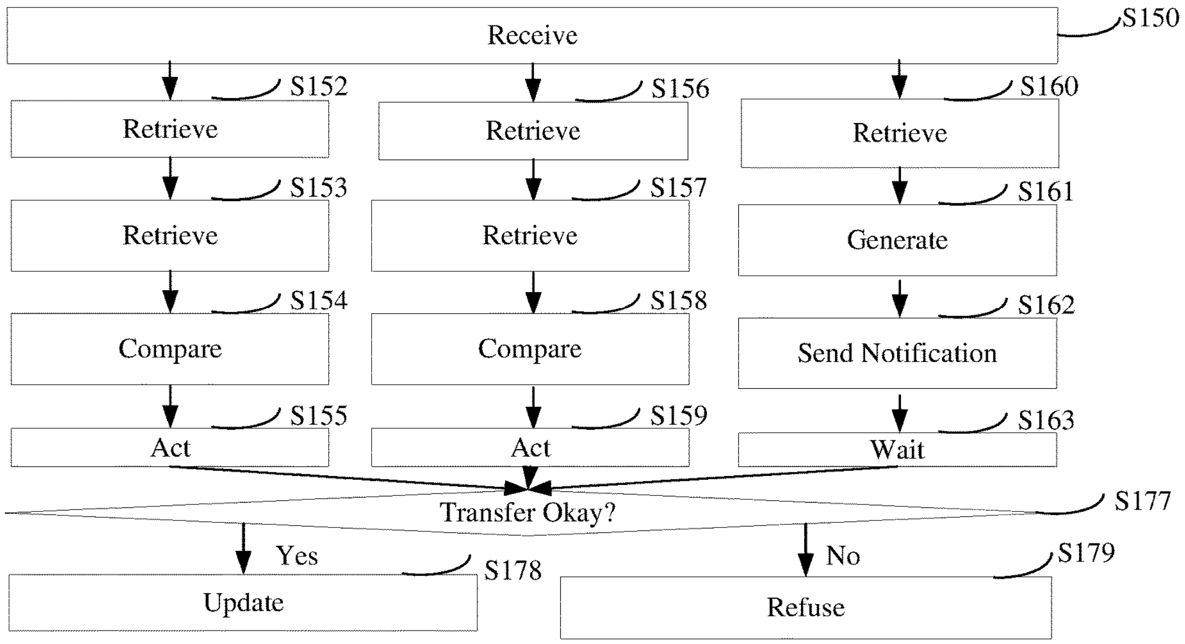
FIG. 1D illustrates a method of confirming a transfer instruction for a VN for digital currencies.

In the method of confirming a transfer instruction for a VN for digital currencies in FIG. 1D, detailed post-processing for transfers of VNs that may apply to any transfer of a VN is shown.

The process of FIG. 1D starts at S150 when a transfer instruction is received by the CS 150 as a SFIOI. At S152, party information is retrieved for the recipient. At S153, party blacklists and party greylists are checked. Other forms of monitoring may be imposed, such as for transactions involving large amounts of VNs or transactions involving a party involved in many other transactions within a relatively small timeframe. For example, the history for a source of the VN and/or a recipient of the VN may be flagged when the source of the VN or the recipient of the VN is relatively new to usage of the VNs, or using a relatively new unique identification to identify themselves. At S154, the party information is compared to the party blacklists and the party greylists. At S155, an action is taken if there is a match from the comparison at S154.

In a second sub-process, at S156 the VN information is retrieved. At S157, VN blacklists and VN greylists are retrieved. At S158, the VN information for the VN subject to the transfer instruction is compared to the VN blacklists and VN greylists. At S159, an action is taken if there is a match from the comparison at S159.

In a third sub-process, at S160 registered owner information for the VN may be retrieved. The third sub-process may be an anti-spoofing process that is selectively applied or that is always applied, for VNs. At S161, a notification is generated for the registered owner VN, such as to a communication address of record for the registered owner of the VN. At S162, the notification is sent. At S163, affirmative confirmation is awaited from the registered owner before authorizing the transfer of ownership in the records. At S177, a determination is made whether the transfer is okay. The transfer of ownership is only okay if there is no match with a blacklist in the first sub-process and the second sub-process, if any requirements are met for greylists in the first sub-process and/or the second sub-process, and/or if confirmation is received in the third sub-process. At S178, the electronic history for the VN is updated if the transfer is okay (S177=Yes). At S179, the transfer is refused if the transfer is not okay (S177=No). A process as in FIG. 1D may be performed any time ownership of a VN is being transferred, and is separate from inquiry processing. Some of the sub-processes in FIG. 1D may be omitted or replaced or supplemented with other sub-processes.

Greylists may be maintained for VNs for a variety of reasons including frequency of transference by a transaction requester, and frequency of activity (e.g., handling of many VNs) by a transaction requester, and economic and/or statistical reasons. Greylists may also be maintained for parties such as transaction requesters who are subject to extraordinary monitoring. Greylists may also be maintained for parties such as transaction requesters that are subject to extraordinary monitoring. Actions taken based on a greylist hit may include notifying a 3rd party such as a government agency, or simply adding an entry for the transfer to a record maintained for the recipient being monitored. Blacklists may be maintained for VNs and parties, and actions taken based on blacklists may include simply include informing the parties that the transaction is not authorized. In some embodiments, a greylist hit may result in initiating an inspection requirement for the VN by ordering that the VN be provided to the CS 150 for inspection of the file for the VN, or that the file for the VN be inspected by a CRP or EWP at an ECD.

As an example, VNs transferred to any address known to belong to a foreign central bank may be placed on a VN greylist, and addresses of foreign central banks may be placed on a party greylist. In this way, transfers of VNs from an account of a foreign central bank may trigger an alert based on both a VN greylist and a party greylist, and may result in notifications being sent to a system that monitors central bank currency flows.

Figure 1E:
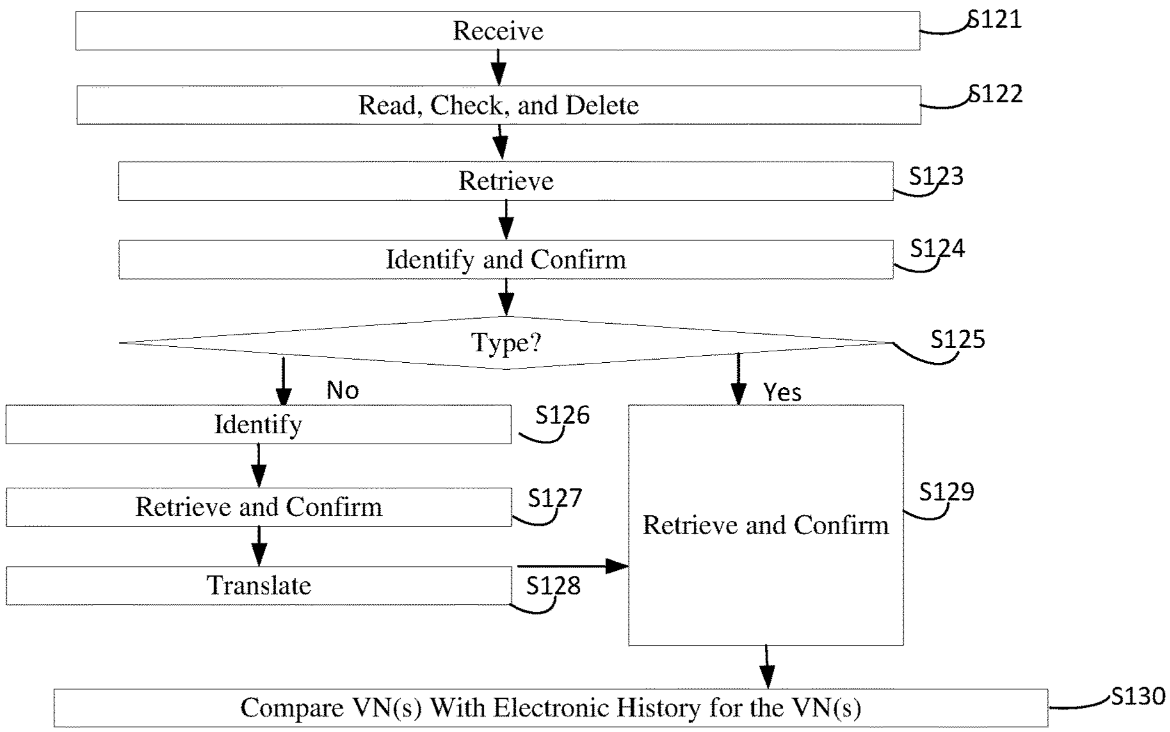
FIG. 1E illustrates a method for a CS to process ownership inquiries for one or more VNs.

In the method for a CS to process ownership inquiries for one or more VNs in FIG. 1E, at S121, a CS 150 receives an ownership inquiry as a SFIOI. At S122, pre-processing on the SFIOI is performed, such as starting with a check of the VN count. At S123, the CS retrieves party information from the ownership inquiry. The process from S123 to S129 is performed to address aliasing if this is permitted. For example, parties may be assigned universal identifications to use for the CS, but may also correlate other identifications such as telephone numbers, drivers license numbers, email addresses and more with the universal identifications. At S124, the CS identifies and confirms a nation and state or region specified in a party identification. At S124, the CS identifies and confirms the nation and state/region specified in fields of the party identification. At S125, the CS determines whether the party information is of a universal party identification type. At S125, the CS determines whether the party identification is of a universal party identification type. If the party identification is of a universal party identification type (S125=Yes), the universal ID number from the final field is retrieved and confirmed at S129. At S126, if the party identification type is not a universal ID (S125=No), the CS identifies the ID type. If the party identification is not of a universal party identification type (S125=No), the ID type of the party identification is identified from the third field at S127. In an embodiment, the ID type may be an application identification of a CRP or EWP used by a user corresponding to the party ID. At S127, the CS retrieves and confirms the ID number. At S127, the ID number of the ID type identified at S126 is retrieved and confirmed. At S128, the CS translates the ID number to a universal ID number used by the CS. The translation at S128 is not required in all embodiments, and should be considered a discretionary process in the teachings herein. Translation may involve retrieving a universal ID from a lookup table in a database. At S129, the CS retrieves and confirms the universal ID number, either after translation at S128 or if the party information is of a universal party identification type (S125=Yes). At S129, the CS retrieves and confirms the universal ID number. Whether translated or not, the universal ID number may be used to check against greylists and blacklists. At S130, the CS compares the VN(s) with the electronic history for the VN(s) to determine whether the current owner of the VN(s) is the party listed by the universal party identification received at S121 in the ownership inquiry. Afterwards, the CS responds to the requesters, such as by a simple yes or no.

Figure 1F:
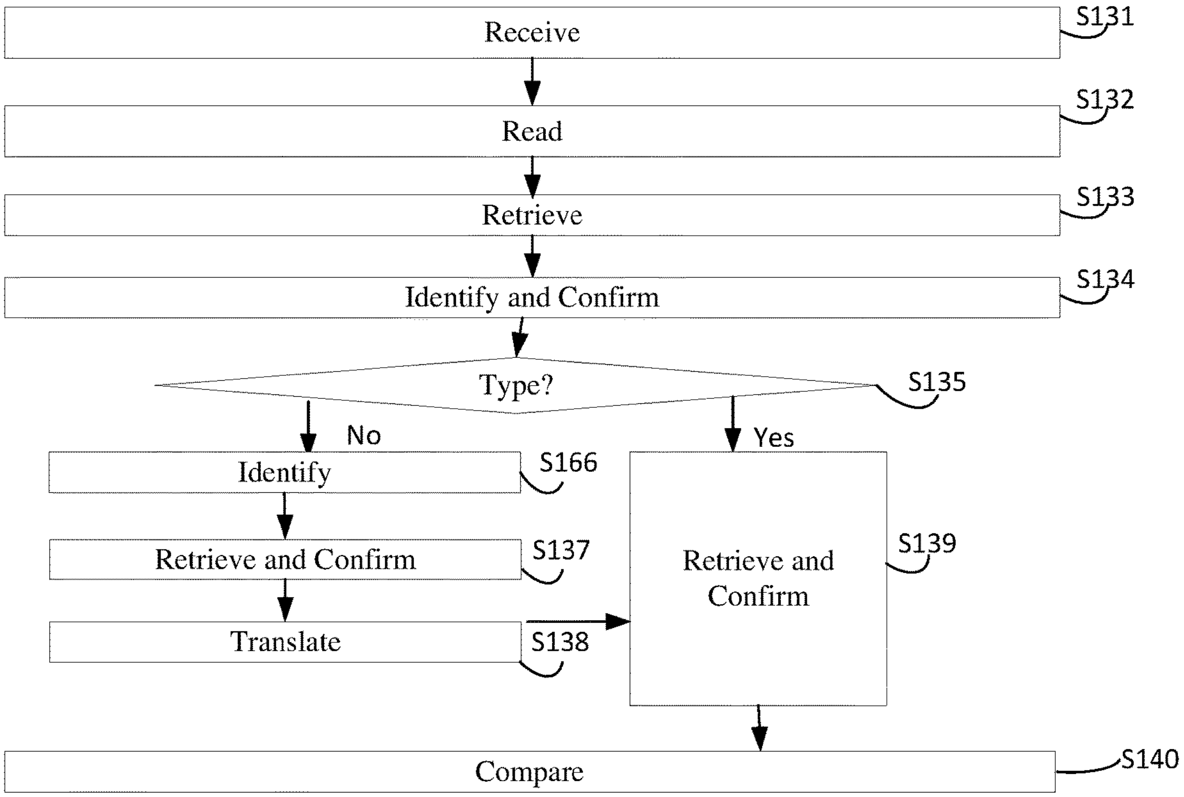
FIG. 1F illustrates a method for a CS to process transfer instructions for one or more VNs.

FIG. 1F illustrates a method for a CS to process transfer instructions. At S131, a CS receives a SFIOI as a transfer instruction. At S132, the CS begins performing pre-processing on the transfer instruction for security. Most or all of the pre-processing described with respect to FIG. 1E is equally applicable to pre-processing in FIG. 1F. At S132, the CS reads a VN count. At S132, the CS also checks the VN count against the actual size of the substantive data in the VN ID fields in the SFIOI. At S133, the CS retrieves party information from the transfer instruction. The process from S133 to S139 is performed to address aliasing if this is permitted. At S134, the CS identifies and confirms a nation and state or region specified in a party identification. At S135, the CS determines whether the party information is of a universal party identification type. At S136, if the party identification type is not a universal ID (S135=No), the CS identifies the ID type. At S137, the CS retrieves and confirms the ID number. At S138, the CS translates the ID number to a universal ID number used by the CS. At S139, the CS retrieves and confirms the universal ID number, either after translation at S138 or if the party information is of a universal party identification type (S135=Yes). At S140, the CS compares the VN(s) with the electronic history for the VN(s) to determine whether the current owner of the VN(s) is the party listed by the universal party identification received at S131 in the transfer instruction.

In FIG. 1E and FIG. 1F, a party identification is processed when a SFIOI is received at a CS. A CS may be configured to accept only a universal ID as a party ID, or may be configured to accept and process multiple types of party IDs. Additionally, when a CS receives multiple types of party IDs, the CS may translate the multiple types into a universal ID type for consistent processing, or may process each of the different types as-is so long as they are accepted.

In some embodiments, the CS 150 may store different alternative IDs in different databases, so that each different set of alternative IDs is isolated from all other sets of alternative IDs. For example, a CS 150 may store a first database of translation tables for translating all telephone numbers in the United States to corresponding universal IDs used by the CS, and another database of translation tables for translating all CRP identifications to corresponding universal IDS. Of course, more than 2 separate database configurations may be used for translations to universal IDs. Isolation of memory arrangements for different memories used for translations of different types of IDs may be used to ensure the fastest possible lookups for universal IDs whenever an alternative ID is received as part of an incoming inquiry or instruction. As an alternative to lookup tables that store alternatives to universal IDs, a universal ID numbering system may be designed so that alternative IDs may be accepted from approved sources such as large social network providers and communication service providers. For example, if a 10 digit universal ID is used for a population up to 9.99 billion people, an 11th digit and 12th digit at the end may be used to specify up to 99 different accounts or other characteristics for an inquiry or instruction being sent to a central tracking system.

In some embodiments, change for VNs may be addressed by a CS. For example, a CS may interpret a change amount, if due field in SFIOIs. The change amount, if due field may specify an amount of change due to the sender of the VN(s) from the recipient of the VN(s). The CS 150 may store information of universal EWPs for parties who use VNs, and may credit and/or debit the universal EWPs for amounts of change agreed to in notifications from senders and recipients. Also or alternatively, the CS 150 may store information of third party (e.g., bank) accounts for senders and recipients of VNs, and may credit and/or debit the third party accounts for amounts of change agreed to in notifications from senders and recipients. In some embodiments, CS 150 may use universal EWPs as a default for crediting and debiting senders and recipients, but senders and recipients may be allowed to update the CS 150 to specify third party accounts to use instead of the universal EWPs.

Figure 1G:
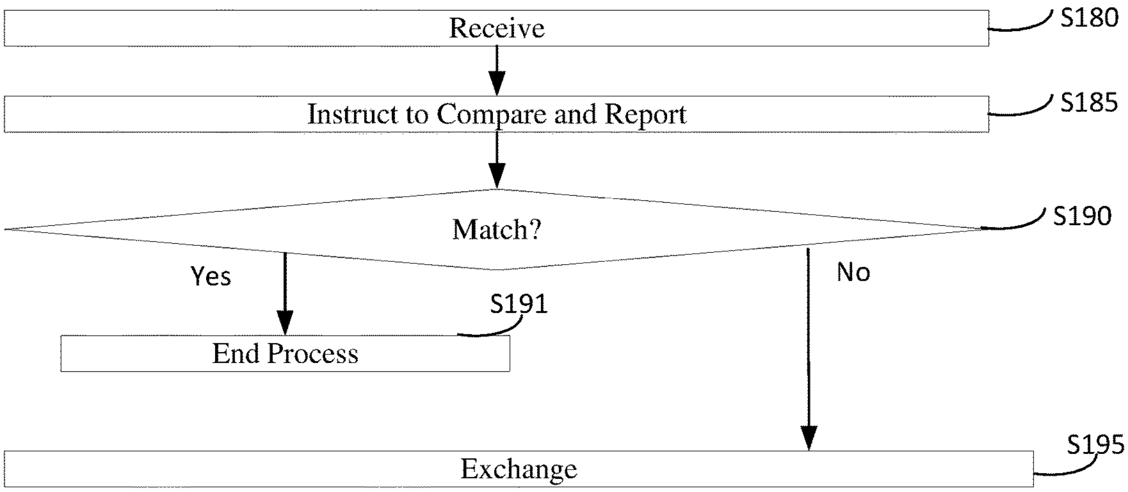
FIG. 1G illustrates a monitoring, inspection, and replacement method for digital currencies.

In the monitoring, inspection, and replacement method for digital currencies in FIG. 1G, a CS coordinates an inspection of a VN by a recipient of the VN. The process of FIG. 1G starts at S180 by receiving a greylist detection notification generated at a CS 150 when notification of movement of a VN on a greylist or to or from a party on a greylist is detected. The CS 150 may have an automated process set up to initiate the process of FIG. 1G. At S185, the new owner of the VN is provided with expected VN characteristics and instructions to compare the expected VN characteristics with the VN and report the results. At S190, a determination is made as to whether a match occurs. The determination at S190 may be received as a notification result from the new owner of the VN after a CRP or EWP analyzes the VN. If there is a match, the process of FIG. 1G ends at S191. If there is no match, the CS 150 may exchange the VN for a replacement VN of the same denomination. For example, the CS 150 may instruct the ECD to forward the VN that does not match expected VN characteristics, and then provide the ECD with a new VN as a replacement. The process of FIG. 1G may result in exchanges for any number of reasons including attempted tampering, successful tampering, wear-and-tear, aging, counterfeiting, passage through owners or geographic regions or nations being monitored via greylists, or any other explanation for why a VN does not include expected characteristics. However, since tampering, spoofing, counterfeiting and other forms of abuse may be so successfully combatted using the teachings herein, exchanges as at S195 may be expected typically for wear-and-tear such as losses of data from dropped packets during communications over electronic communication networks.

In some embodiments, a permanent EWP may be provided for the life of an end user and fully or partially managed by a CS. The permanent EWP may be assigned after the birth of a party, and a unique identification may be assigned to the party. The permanent EWP may then be created, and may be capable of receiving and storing financial products such as digital currencies on behalf of the party. At any time during the life of the person, an entity that owes the party payment for any reason may transfer the payment to the permanent EWP, such as when the entity cannot find the party to arrange for payment. A government wishing to distribute stimulus funds to persons such as adult citizens may transfer the stimulus funds for the party to the permanent EWP. Nations may allow non-citizen residents or others to obtain unique identifications and permanent EWPs. Additionally, biometric identifiers such as a fingerprint, retina scan, DNA, or any other form of biometric identifier that can be electronically recorded may be obtained and correlated to the permanent EWP, so as to allow the party to present themself to an institution authorized to provide access to the permanent EWP. CS s may allow parties to designate access controls to the permanent EWP. For example, a party may require that subsequent withdrawals from the permanent EWP require a fingerprint of the party, a retina eye scan of the party, or one or more other forms of party-based inputs that can be used to control access.

In some embodiments, a CS may include a data center to handle large volumes of data managed by a CS, such as for the MMS 153 or for multiple elements of the CS 150. The data center may be configured to process instructions derived from SFIOIs by referring to or updating data in the data center. Data stored at a data center and retrievable for use from the data center may include VN electronic histories, VN group information (e.g., characteristics such as background imagery for groups of VNs), party information (e.g., unique electronic communication addresses and program/application identifications, nationality, residence, currently-owned and previously-owned VNs and dates of transfer), greylists for VNs, blacklists for VNs, greylists of owners, blacklists for owners, and so on. A data center may include more than one data center, and may use scalable memory. Structured query language (SQL) may be used if database configurations at the data centers must be compatible with legacy databases that already use SQL. SQL may be useful for handling structured data in relational databases.

Alternatively, non-SQL (NoSQL) may be used if the database configurations do not require relational databases, and may be useful for real-time inquiries such as ownership confirmations for VNs via the LSS 152. An example of a NoSQL configuration that can be used is a MongoDB configuration, which provides for a file system that may be used for storing VNs according to unique identifications, and which is considered a document-oriented database that may be used for storing user profile documents that include the history of ownership of various VNs. Data centers may be implemented in private cloud configuration that isolate equipment and operations for the digital currency from equipment and operations for other parties and uses. For example, data centers may use solid-state drive (SSD) arrays to store data. SSDs may be preferable to hard disk drives (HDD) in terms of faster speeds and lower power use etc. Databases may be implemented on a paired-basis by which each memory configuration is paired with a different dedicated server, or on a dynamically reconfigurable basis so that underused servers may be put to work to relieve overworked servers.

In some embodiments, VNs may be provided as folders that include several files. For example, a VN may include a relatively small amount of data including image data, variable data and so on. Some of the use data stored as metadata for a VN may be provided as an separate encrypted file with JSON or BSON data, and may be transmitted to the CSs via an application programming interface (API). The use data may be captured and stored in data fields within the JSON/BSON file. CSs may send signals via APIs to devices where VNs are stored, and the signals may indicate that the data in the JSON/BSON file has been stored at the CS and can be deleted from the device where the VN is stored, thereby reducing the amount of data sent with the VN as the VN is transferred. A VN and/or API may be configured to communicate via a specific port of a server or database in the data center to notify with updates, and this also may reduce the workload at the CSs. One or more types of SFIOIs described herein may include JSON/BSON updates, and these communications may be handled by updating records at a CS with details from the JSON/BSON updates once the SFIOI is cleared through a SGS 156. In some embodiments, VNs may include a private address that is useless to the public in a metadata field, but which is interpretable by the CS or another control system, and may include a private server or database address, or even a specific port address of a private server or database address. CSs may unpackage updates to identify which private server or database address stores the record for the VN, and this may serve as a supplement or alternative to addressing based on unique identifications of the VNs, so that even if a CS or control system even partially uses the unique identification of a VN to identify a sub-group of servers and databases used to store the record for the VN, the private address sent by the VN may be used to specify a server, a database, a server port, a database port, or another internal communications address within the sub-group for a component that is not reachable by any public address.

Figure 2A:
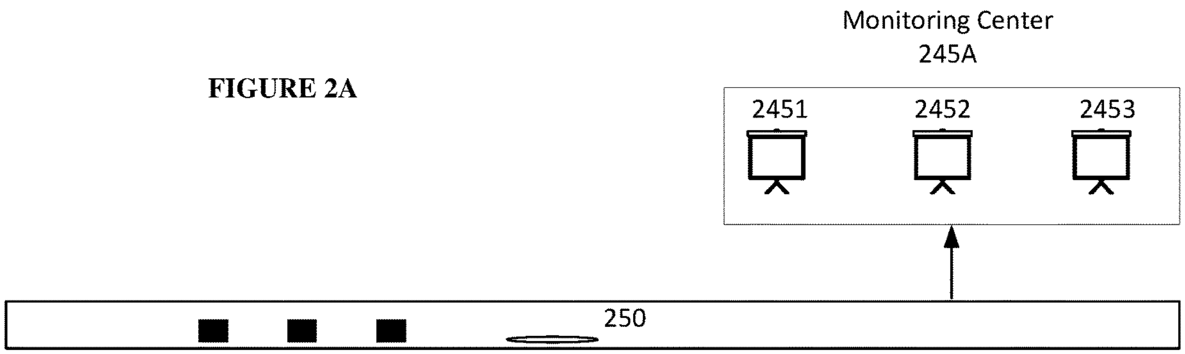
FIG. 2A illustrates a monitoring center for a digital currency.

In the monitoring center for a digital currency in FIG. 2A, movement of VNs may be monitored for uses such as analysis by economists at central banks. A monitoring center 245A receives data for a digital currency from a CS 250. The monitoring center 245A includes a first display 2451, a second display 2452 and a third display 2453. The monitoring center 245A may be used by officials of a government treasury department and/or a central bank to monitor information such as flows of VNs over borders, between types of accounts, at certain times of day and days of weeks, and so on. The monitoring center 245A may also monitor information such as flows of other currencies over borders, between types of accounts, at certain times of day and days of weeks, and so on. In this way, officials may aggregate and track data showing trends and patterns of use of VNs. The monitoring center 245A may be integrated with or provided separately with the artificial intelligence and analytics system 154 in FIG. 1B. At the monitoring center 245A, officials may be provided with computers that can be used to generate and render images and videos on the first display 2451, the second display 2452 and the third display 2453 based on information retrieved from or otherwise provided by the CS 250.

Figure 2B:
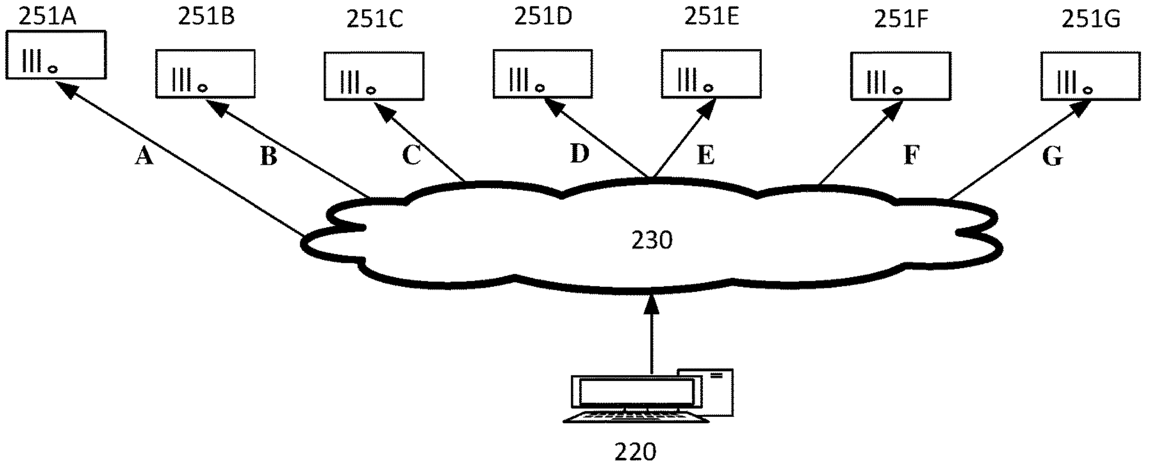
FIG. 2B illustrates separate addressing for different types of communications to a CS.

In FIG. 2B separate addressing for different types of communications to a CS is shown. For example, a CS may include multiple subsystems that receive and process incoming SFIOIs. Different types of SFIOIs may present different levels of risks of hacking, spoofing, denial of service (DOS) attacks, and other types of malicious behaviors. Accordingly, if the authorities behind a CS have sufficient presence of mind before building the CS, the CS and any type of end user software and intermediate party software may be designed to accommodate multiple different electronic communication addresses for different types of SFIOIs. In FIG. 2B the multiple subsystems include a first central subsystem 251A, a second central subsystem 251B, a third central subsystem 251C, a fourth central subsystem 251D, a fifth central subsystem 251E, a sixth central subsystem 251F and a seventh central subsystem 251G. As an example, the first central subsystem 251A may receive and process ownership inquiries for VNs, and may interact with a ledger subsystem that stores a limited subset of records such as the current ownership for each VN. As an example, the second central subsystem 251B may receive and process transfer instructions from trusted parties such as banks and large businesses. Trusted parties may not be subject to heightened verifications before transfers of VNs are processed when the trusted parties are the source of the transfer instructions. As an example, the third central subsystem 251C may receive and process transfer instructions from end users with relationships with trusted parties, such as from end users using an application provided by their bank to send the transfer instruction. The fourth central subsystem 251D may receive and process transfer instructions from purported recipients of VNs. As an example, the fourth central subsystem 251D may be configured to verify the transfer instructions by contacting the current owners at their addresses of record as a form of additional authentication, to both counter spoofing attempts and to counter fraudulent transfer instructions from the purported recipients of VNs. The fifth central subsystem 251E may receive and process transfer instructions from overseas sources. For example, the fifth central subsystem 251E may be configured to verify the transfer instructions in the manner of the fourth central subsystem 251D, and may be configured to create and update records used to show flows of currencies over borders. The sixth central subsystem 251F may receive and process transfer inquiries such as complaints, notifications of suspicious or fraudulent activities, and other forms of special matters that require special handling. Even complaints and notifications received by the sixth central subsystem 251F may require specific handling and formatting in the manner described herein, to counter hacking. The seventh central subsystem 251G may be used to exchange VNs with other CSs. In this way, central banks may use dedicated resources to transfer VNs with other central banks, partly as a way to isolate such matters from other types of inquiries and instructions that are expected to present greater risks of misconduct.

As another example, a separate central subsystem (not shown) may be used to process VNs that are stored on legacy-type user devices without browsers. For example, a separate central subsystem may receive formatted messages as text messages from such user devices without browsers, and may have its own security protocols such as by verifying the user devices with wireless communication carriers and/or by initiating anti-spoofing messages to telephone numbers at the user devices requiring confirmation of instructions to transfer one or more VNs.

Figure 3A:
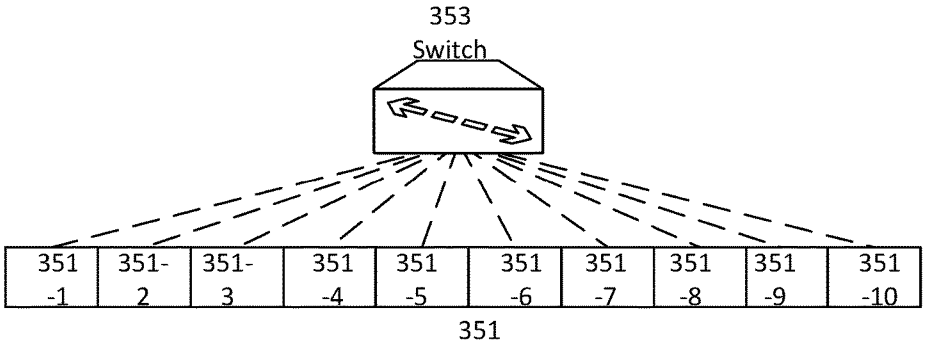
FIG. 3A illustrates a memory arrangement for a memory system in FIG. 10A.

In the memory arrangement for a memory system in FIG. 3A, a communication system divides a memory system based, for example, on unique identifications of the VNs. The MMS 351 is partitioned into 10 separate sections. Each of the 10 separate sections of the MMS 351 may be separately addressable by separate communication addresses that can be recognized by the switch 353. The switch 353 is representative of a switching system and may include multiple switches that each receive instructions such as to update records of VNs. The sections of the MMS 351 may be physically separated from each other, such as in different rooms, different buildings, different zip codes, different counties, different states, or different countries. The logical arrangement of 10 separate sections for the MMS 351 may correspond to the first character in the unique identifications of VNs. For example, unique identifications of VNs may each start with a number 0 through 9. VNs with unique identifications starting with 1 may be assigned to section 351-1, VNs with unique identifications starting with 2 may be assigned to section 351-2, and so on. Partitioning of the MMS 351 is not required, but when implemented in this way, the partitioning is also not limited to 3 separate sections. For example, an addressable memory system may be logically partitioned into up to 26 sections to correspond to lettering from A to Z. An addressable memory system may also be logically partitioned into up to 30 sections to correspond to two-digit numbers from 0 through 99. Accordingly, addressing that is based on unique identifications of VNs may be used to distribute workloads so that read and write operations for the MMS 351 may be performed more quickly and efficiently.

Figure 3B:
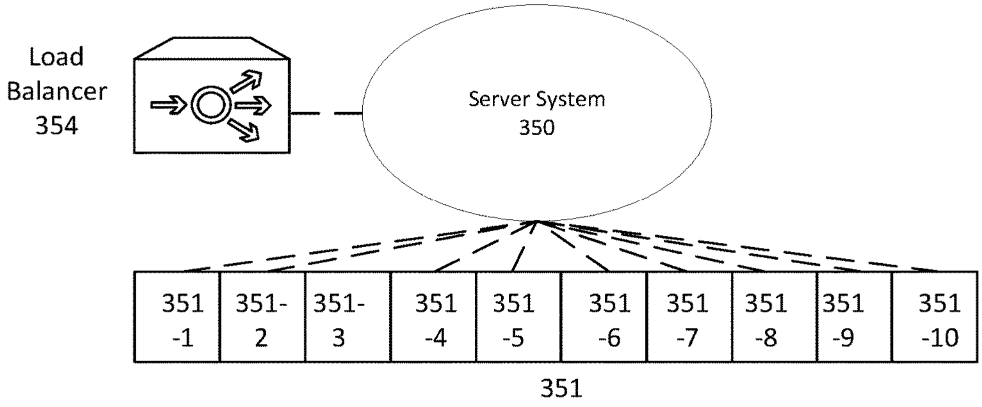
FIG. 3B illustrates another memory arrangement for a memory system.

In the memory arrangement for a memory system. FIG. 3B, a communication system divides server workload based, for example, on a load balancer that measures workloads of equipment used to process VNs. In FIG. 3B, a server system 350 is used to communicate with the separate sections of the MMS 351. A load balancer 354 may monitor workloads of servers in the server system 350 to reduce or increase work assigned to the servers in the server system 350. Each server in the server system 350 may be configured to receive updates to any of the separate sections of the MMS 351, and may be used to program the updates and read or write data to any of the separate sections of the MMS 351. Accordingly, internal addressing at a CS may be based on a common address of the server system 350 or may be based on individual addresses of the separate sections for the MMS 351. For example, when communications are addressed generically to the server system 350, each server in the server system 350 may be configured to identify the unique identification that uniquely identifies each VN which is the subject of any inquiry or update assigned to the server, and each server in the server system 350 may be configured to then implement the inquiry or update to the appropriate section of the MMS 351. Alternatively, when addressing is based partly on the unique identifications of the VNs, each server in the server system 350 may be configured to identify the appropriate section of the MMS 351 based on the addressing.

Figure 3C:
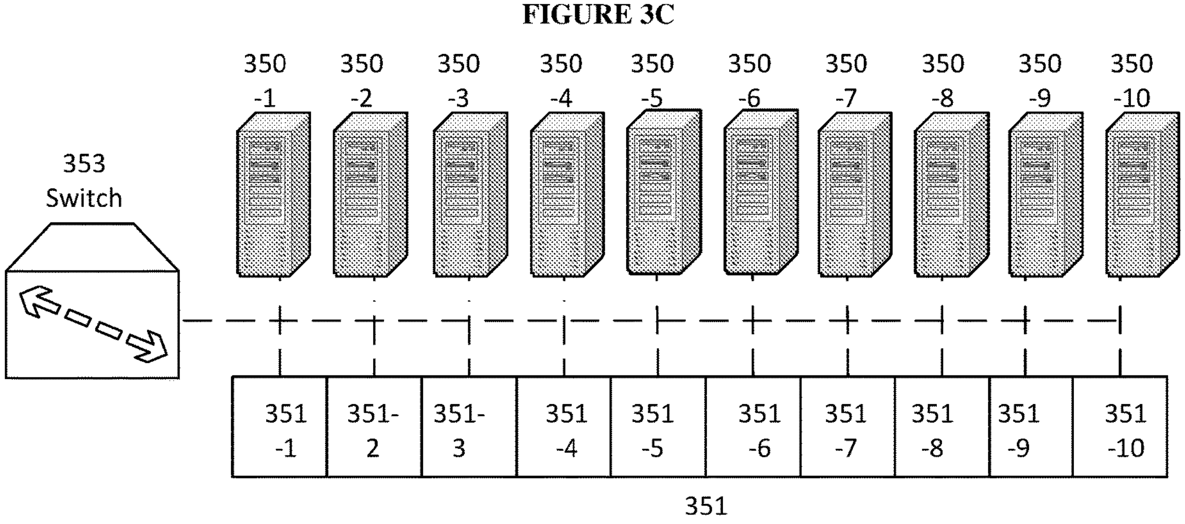
FIG. 3C illustrates another memory arrangement for a memory system.

In the memory arrangement for a memory system in FIG. 3C, a communication system divides workload of servers and memories based, for example, on unique identifications of the VNs. In FIG. 3C, a server system includes servers which are each assigned to a corresponding section of the MMS 351 on a one-on-one basis. A switch 353 may assign inquiries or updates to the corresponding servers based on addressing specific to the corresponding servers, such as when the addressing of incoming communications is based in part on the unique identifications of the VNs. The server system in FIG. 3C is partitioned into 3 separate sections. Each of the 3 separate sections of the server system may be separately addressable by separate communication addresses that can be recognized by the switch 353. The switch 353 is again representative of a switching system and may include multiple switches that each receive requests such as verification requests or requests to update records of VNs. The servers of the server system in FIG. 3C may be physically separated from each other, such as in different rooms, different buildings, different zip codes, different counties, different states, or different countries.

Additionally, the CS may also require that communications comply to specific formats limited to a small set of types of communications approved for handling. The internal servers and databases may be assigned private local addresses meaningful only to the CS or another form of control system. Internal servers may be numbered 1 to 1000, and internal databases may be numbered 1 to 1000, so that the CS tracks records for updating and retrieval by the private local addresses and not any public addresses.

In some embodiments, artificial intelligence may be used to optimize operations for a CS 150 in embodiments herein. For example, problematic datasets that may be applied to artificial intelligence in training to detect features and patterns may include: data corresponding to detected attempts to counterfeit VNs, data corresponding to detected attempts to spoof parties or user devices, data corresponding to detected attempts to spoof authorized software programs, data corresponding to reported lost VNs, data corresponding to reported stolen VNs, and data corresponding to detected unauthorized attempts to validate ownership of VNs. The artificial intelligence may be used to automatically subject some incoming communications such as transfer instructions to additional processing such as multi-party authentication, spoofing checks with owners of record of VNs using the addresses on record for the owners, and other forms of additional processing. Artificial intelligence may be trained using transaction data, VN data, account data, party data, and/or any other data sets in the server system 350 as training data. For example, artificial intelligence may be used to detect suspicious or criminal transactions, likely mistaken transactions, likely unauthorized transactions, or any other concerning activity that can be detected based on patterns identified from artificial intelligence. Multiple different instances of artificial intelligence programs may be applied to new data and information stored in the server system 350, and may be applied for a variety of reasons such as to detect fraud and counterfeiting attempts based on, for example, accounts, types of transactions, locations where transactions occur, and types of VNs involved.

Figure 4:
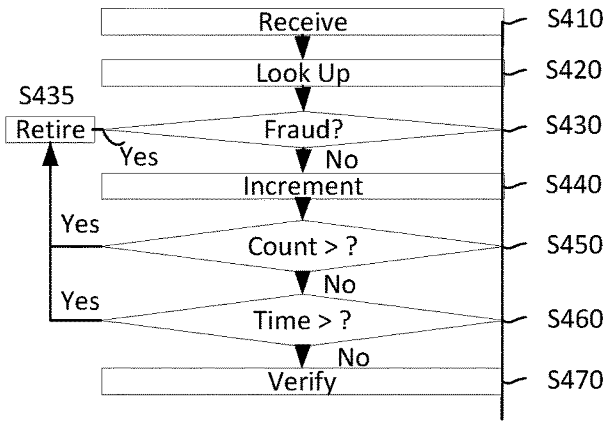
FIG. 4 illustrates a method for retiring a virtual note of a digital currency

In the method for retiring a virtual note of a digital currency in FIG. 4, a verification request for a VN is received at S410, such as by a verification system from the first party ECD 101, the second party ECD 102 or the third party ECD 103. At S420, a verification system such as the CS 150 looks up the electronic history for the VN. The verification system may look up the full electronic history from the MMS 153 at S420. At S430, the verification system determines whether the verification request involves fraud, such as if the VN does not belong to the purported owner of the VN. If the verification request involves fraud (S430=Yes), the VN is retired at S435. The VN may be retired by contacting the last owner of record for the VN, and instructing the last owner of record to forward the VN to the CS 150 in exchange for another VN of the same denomination. The VN may then be retained in storage, such as in the MMS 153. If the verification request does not involve fraud (S430=No), the transaction count for the VN is incremented at S440. At S450, the verification system determines whether the transaction count for the VN is above a threshold. For example, the threshold for usage of a VN before the VN is retired may be 100 transactions, 1000 transactions, 5000 transactions or another number. If the transaction count for the VN is above the threshold (S450=Yes), the VN is retired at S435. If the transaction count for the VN is not above the threshold (S450=No), the verification system determines whether the circulation time for the VN is above a threshold at S460. For example, a threshold circulation time for a VN may be 1 year, 3 years, 5 years, or another amount of time. If the circulation time for the VN is above the threshold (S460=Yes), the VN is retired at S435. If the threshold time for the VN is not above the threshold (S460=No), the VN is verified at S470 without being retired. A VN may be retired from service when a fraudulent attempt to transact the VN is detected, when the VN has been involved in at least a predetermined threshold number of transactions, or when the VN has been in circulation for a predetermined threshold amount of time. Reasons and bases for retiring a VN are not limited to those described herein.

In some embodiments, a CS may be synchronized with ECDs. The synchronization may include a predetermined arrangement to not conduct transactions of transfers involving VNs managed by the CS for a time period. The time period in which transactions and transfers will not be made may be a time period in which the CS replaces equipment, updates backup memory such as electronic records and user profiles and account profiles, performs software updates, or otherwise will be unreachable. The time period may be a predetermined time each day, each week, each month, or each year, and may be at times when a minimal amount of activity is expected to be affected. In some embodiments, the time period may be dynamically set, such as for urgent or emergency reasons. In some embodiments, synchronization can be used to halt transactions and transfers at different times such as for different time zones. For example, halts may be set for 3:30 AM each Monday for five minutes, and may be stepped to each time zone when the time zone reaches 3:30 AM each Monday. Alternatively, ECDs may be grouped on other bases, such as manufacturer, wireless communication service provider, year of manufacture, service provider for the CRPs and EWPs, or any other logical basis, so that different groups can be halted at different times for set time periods or until a notification is received from the CS. In some embodiments, synchronization can be used to halt transactions and transfers in different places. For example, halts may be set for 3:30 AM each Monday in North America, 3:30 AM each Tuesday in Europe, 3:30 AM on Saturday in the Middle East, and so on. Synchronization may be provided for reasons other than halts, such as to update communication addresses for the CS.

Figures 5A, 5B:
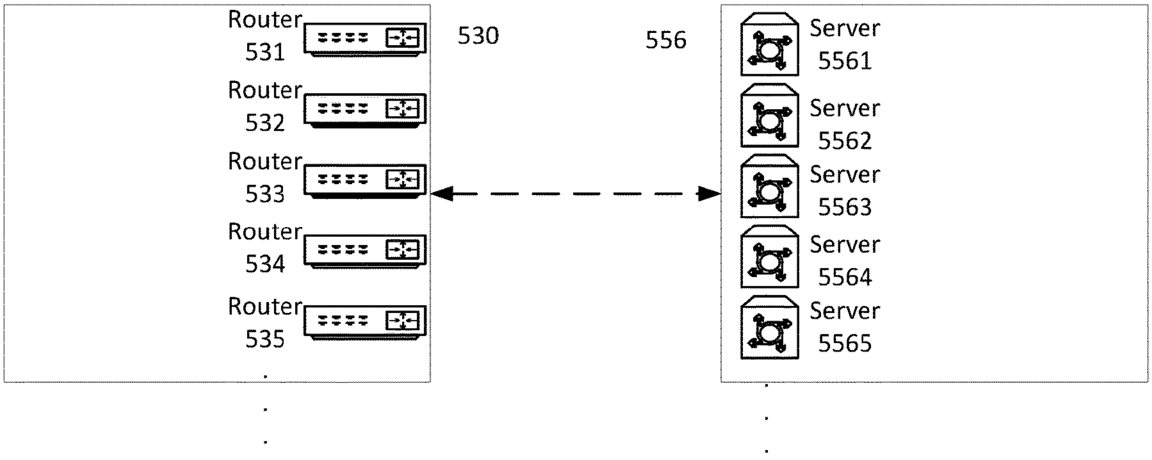
FIG. 5A illustrates an electronic communications network integrated with a SGS (security gateway system) of a CS.
FIG. 5B illustrates a working memory configuration of a server in a security gateway of system of the CS in FIG. 5A.

In the electronic communications network integrated with a SGS of a CS in FIG. 5A, an electronic communications network 530 includes routers including at least a first router 531, a second router 532, a third router 533, a fourth router 534 and a fifth router 535. The SGS 556 includes servers including at least a first server 5561, a second server 5562, a third server 5563, a fourth server 5564, and a fifth server 5565. Since addressing over the electronic communications network 530 to the CS 550 may be simplified by limiting communications to 1 or few specific internet protocol (IP) addresses, the routers within the electronic communications network 530 may be configured to ensure they are not overloading any particular server of the SGS 556. For example, routers within the electronic communications network 530 may logically vary communications addressed to a specific internet protocol (IP) address by sequentially sending a first incoming packet or set of packets to a first server of the SGS 556, then sending a second incoming packet or set of packets to a second server of the SGS 556, then sending a third incoming packet or set of packets to a third server of the SGS 556, and so on. The routers may also determine a recipient router of the SGS 556 using a clock, so that an incoming packet or set of packets received at a second ending in "1" are sent to a first server, an incoming packet or set of packets received at a second ending in "2" are sent to a second server, and so on. Any known mechanism for varying addressing and routing to avoid congestion and overloading a recipient may be used within the electronic communications network 530, so long as loads to servers of the SGS 556 are balanced in the manner intended by the designer of the CS 550. In some embodiments, a CS 550 may include the last-mile routers. In this way, the routers may be dedicated to the internet protocol (IP) addresses of the CS 550, even though they only, or primarily but non-exclusively, route to or from these internet protocol (IP) addresses. In this way, the logical variations of packet routing to the servers of the SGS 556 may be specifically controller by technologists who design and/or run the SGS 556. In some embodiments, network routers implemented in the electronic communications network 530 or as intakes at the CS 550 may disable incoming transmission control protocol (TCP) receipt, and allow only user datagram protocol (UDP) receipt in order to avoid allowing any outside entity to establish a connection via TCP. Alternatively, sequence throttling may be implemented by such routers, so as to delete any packet sequences higher than 1, 2, 3 or another predetermined threshold, as this may ensure that SFIOIs described herein are consistently sent via stand-alone IP packets even when carried via TCP.

The working memory configuration of a server in a SGS of FIG. 5B includes a first server 5561 shown to include 9 groups of address spaces (ASs) in memories, each with 8 separate address spaces. The individual address spaces may be at physically separate memory addresses of a memory such as an SSD memory, and may be dedicated to the functionality of the individual address spaces. Alternately, the individual address spaces may be at logically separated and re-assignable memory addresses of a memory such as an SSD memory. The first server 5561 is representative of servers in the SGS 556. Each address space may temporarily store a single SFIOI received from the public as it is processed in the CS 550. The first server 5561 may run a predetermined security process on the single SFIOI.

In some embodiments, SFIOIs may be sent as individual packets without any handshaking via UDP, and responses may be sent after a handshake via TCP. In this way, central systems may receive stand-alone SFIOIs as individual packets via UDP or via sequence-throttled TCP, and may engage in sessions only with familiar communication addresses of records.

In some embodiments, an entire SFIOI is stored in an isolated address space, and bytes of the SFIOI in the isolated address space are processed in a specific order for specific purposes. For example, a first process may check the size of the SFIOI when the predefined format for the SFIOI sets a size requirement for the packets of the SFIOI. The predefined format may also set one or more formatting requirement for party identifications included in the packets and for unique identifications of instances of the tracked digital asset (e.g., the VNs of the NDC) included in the packets. If the SFIOI is too big or too small, the SFIOI may be deleted. A second process may check the type of the SFIOI, such as by interpreting a specific byte or bytes which the format requires to describe the type of the SFIOI. Types may be limited, such as to an ownership inquiry, a transfer instruction, a special handling instruction (e.g., taking my VNs offline, require multi-factor authentication before allowing transfer of my VNs, etc.) Other processes are described elsewhere herein. The processes may be staggered sequentially on each packet, while different processes operate in parallel on different packets. Additionally, processes that involve checking with an external resource (e.g., ownership checks, special handling instructions for owners, multi-factor authentication checks) may be initiated by one set of processes that do not wait for answers. Instead, another set of processes may process answers from external resources.

The different bytes and bits of a SFIOI that are processed in isolation may be isolated using a mask, such as by effectively using a bitmask or byte mask to set data that are not to be effectively processed (i.e., data that is to be ignored) uniformly to zero. The data of the read word line being processed may then be processed in isolation. Each processor, core or thread may use a different mask. A thread may apply the same mask over and over, thousands of times per minute when working, as the thread is performing the same process over and over on different packets, and the process itself may include relatively few steps and operations compared to other processes applied by the SGS 556. Formatting for SFIOIs may specify that each of multiple or all different substantive element(s) (field(s)) of an SFIOI start every 64 bits, or end every 64 bits, and all other bits should be set to zero or one. In this way, a first VN may start at byte #33, a second VN (if any) may start at byte #41, a third VN (if any) may start at byte #49, and so on. Since individual threads process the different bytes according to the format of the SFIOI, a thread may isolate a value of whatever the thread is assigned to repeatedly process in isolation, and effectively ignore any other data.

Figures 5C, 5D:
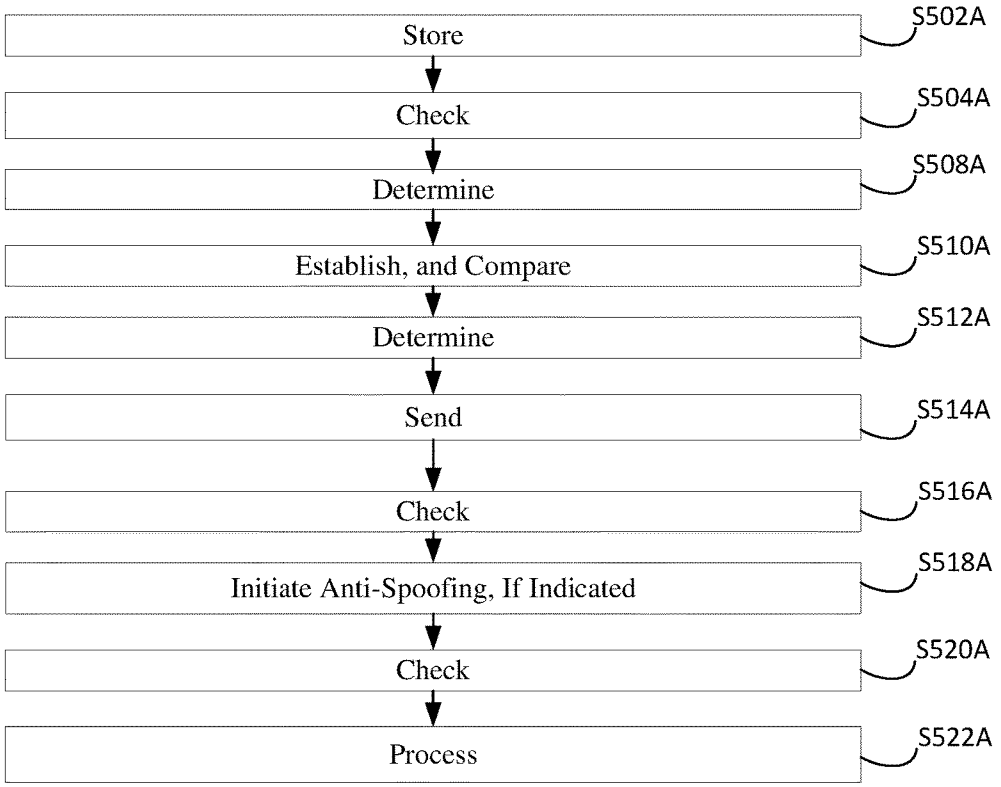
FIG. 5C illustrates a method of a SGS processing a received instruction or inquiry.
FIG. 5D illustrates a memory arrangement for a SGS that processes a received instruction or inquiry.

In the method of a SGS processing a received SFIOI in FIG. 5C, an overview of efficient security checks performed at a SGS starts at 5502A by storing a packet payload in an address space. The packets may be stored individually in pages of flash memory for processing at the SGS. The packets may be sent asynchronously from anywhere in the world without initiating a connection, so that the sender may expect a fast response if the packet is processed and meets expectations of the SGS. Of course, the teachings herein are not limited to packets that are 512 bytes, or that are all of a uniform size.

At S504A, a size of the packet payload in bytes is checked. The total length of the meaningful data in the packet payload may be specified in a header of the packet, and this header information may be compared with the actual length of the meaningful data stored in the address space. At S508A, the number of VNs purportedly identified in the SFIOI is determined. The number of VNs purportedly identified in the SFIOI may be specified in a specific byte according to the format set for the SFIOI. At S510A, the expected size of the meaningful data in the packet is established from the number determined at 5508A, and the expected size determined at S510A is compared with the actual size determined at 5504A. At S512A, the purported owner identification for the VNs specified in the SFIOI is determined. At S514A, the purported owner identification is sent along with each separate VN identification for an ownership check. The purported owner identification may be sent with each separate VN identification in a single communication or as batch of separate communications to the LSS 152. At S516A, a check is made for stored instructions from the actual owner of the VNs, if any such instructions exist. The check at S516A may be to the MMS 153 if the handling instructions from owners of VNs are stored there, or to the LSS 152 if the handling instructions from owners of VNs are stored there, or to another storage system that stores handling instructions if separate from LSS 152 and the MMS 153. At S518A, anti-spoofing is initiated, if indicated by the stored instructions checked at S516A. At S520A, a type of the SFIOI is checked. The type may include inquiry, instruction to transfer to another party, instruction to transfer to a different account or device of the same owner, instruction for special handling, and so on. At S522A, the SFIOI is processed, according to the checked type. If the instruction is an instruction to transfer ownership of the VNs, an instruction may be sent to the MMS 153 to update the ownership records for the VNs. Processing may also include decrypting unique identifications for VNs when the SFIOI is an ownership inquiry, and the unique identifications of VNs may only be decryptable by the CS 150, and specifically by the SGS 156. Other processing may involve notifications to other central systems that track other digital currencies, or other instructions or acknowledgements processed by the SGS 156.

In the memory arrangement for a SGS that processes a received SFIOI in FIG. 5D, 9 separate bays are shown for a first server 1561. Each bay includes address spaces listed from address space #1 (i.e., AS1) to address space #50,000 (i.e., AS50K). Packets received by the server may be serially stored in bays 1 at a time, such as until 40000 address spaces are filled with 40000 packets. Processing resources of the first server 1561 may begin processing the packets as soon as packets are first added to the bay. If 40000 packets are received each minute at the SGS 156, the packets may be stored in 1 bay of 1 server until the 40000th packet is received, and then newly-received packets may be assigned to another bay of either the same server or a different server. As another example, packets may be distributed randomly or on a logical basis to different packets, such as when one group of 1 or more servers are tasked to process the instructions and inquiries for a time period, before being replaced by another group of 1 or more servers.

Figure 5E:
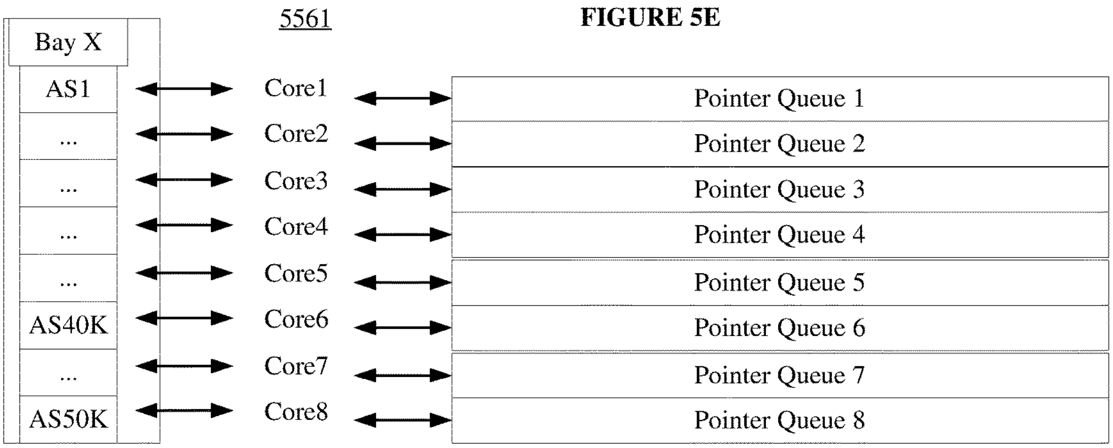
FIG. 5E illustrates a processing arrangement for a SGS that processes a received instruction or inquiry.

In the processing arrangement for a SGS that processes a received SFIOI in FIG. 5E, the first server 1561 includes 8 cores which each have a dedicated pointer queue. The cores may be some or all of the cores of a multi-core processor, or may be distributed among multiple multi-core processors and/or single-core processors. The cores perform operations on address spaces in bay X in the order in which the address spaces are assigned to their dedicated pointer queues.

Figure 5F:
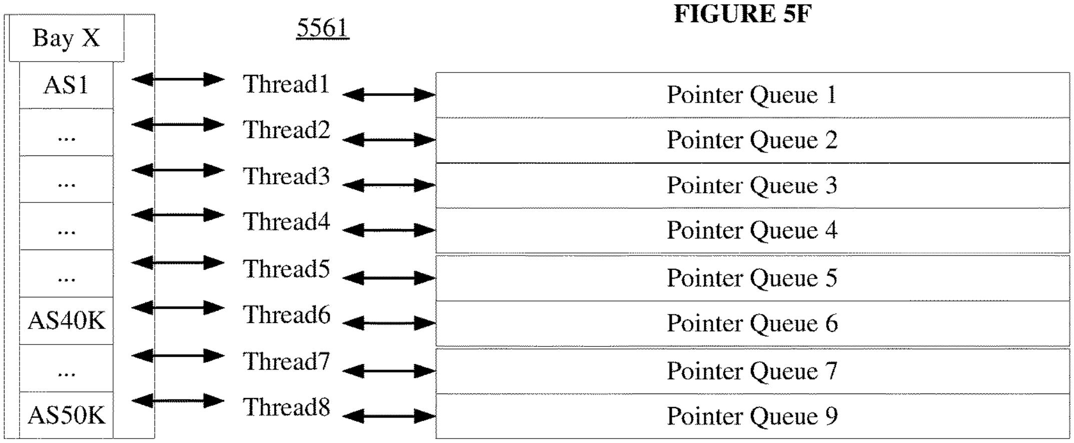
FIG. 5F illustrates another processing arrangement for a SGS that processes a received instruction or inquiry.

In the processing arrangement for a SGS that processes a received SFIOI in FIG. 5F, the first server 1561 includes 8 threads which each have a dedicated pointer queue. The threads operate on address spaces in bay X in the order in which the address spaces are assigned to their dedicated pointer queues. In effect, the threads each perform 1 or very few tasks repeatedly and iteratively on large numbers of address spaces which store newly-received packets, and the threads should be capable of readily handling 40000 packets in a minute. The first server 1561 may be specifically configured to have threads in quantities capable of being able to handle all tasks described herein, and likely even more tasks than are described herein.

Figure 5G:
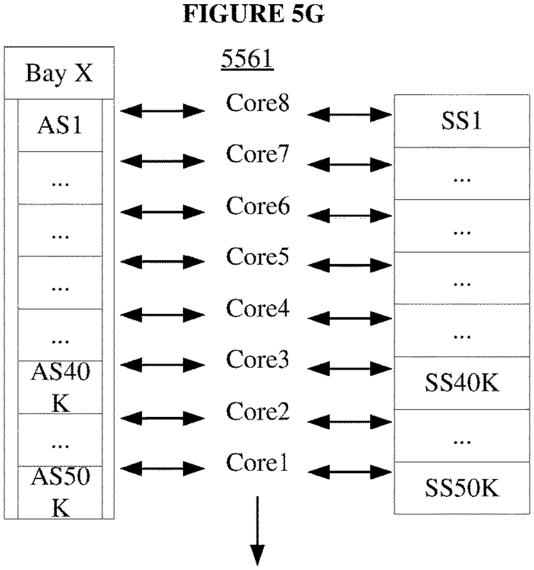
FIG. 5G illustrates another processing arrangement for a SGS that processes a received instruction or inquiry.

In the processing arrangement for a SGS that processes a received SFIOI in FIG. 5G, a set of cores at the first server 1561 refer to a status space which stores statuses for each of the address spaces on a 1 to 1 basis. In this regard, whereas the address spaces may fit a full formatted SFIOI of 512 bytes or another relatively large amount, the status spaces may be on the order of 4 bytes. The address spaces may be non-volatile flash memory, and the status spaces may be volatile DRAM memory, for example. Within 4 bytes or perhaps 5 bytes, the status spaces may specify which address space they correspond to, along with the actual status of the address space. The statuses may specify which of the cores is to process the address space next and/or which of the cores processed the address space last. In this way, the set of cores can refer to the status spaces sequentially and process the packet payloads in the corresponding address spaces when the status indicates that the core is to process the packet payloads in the corresponding address spaces. The first core (core #1) should start the processing on any address space starting with the first address space (AS1), then update the corresponding status space (SS1), then start processing the second address space (AS2), then update the corresponding status space (SS2). The remaining cores will start processing with the first address space once the first status space (SS1) indicates to do so, and then update the first status space (SS1) before checking with the next status space. Of course, if any processing indicates that the packet payload in the corresponding address space should be deleted or otherwise left alone, the status in the status space may be updated to reflect a status that indicates deletion, such as "99" to indicate that the next processing will be deletion. When processing for any of the address spaces is completed, the statuses in the corresponding address spaces may also be updated to reflect that the next process will be deletion. In this way, once all packet payloads in bay X are regularly processed and ready to be deleted, the last status in the corresponding status spaces may uniformly reflect the status that indicates deletion. When bay X is fully deleted, bay X may be put back into circulation for another batch of incoming packets. The bays may be given a break, such as 30 or 60 minutes, after use, in order to allow the circuitry to cool down etc.

Figure 5H:
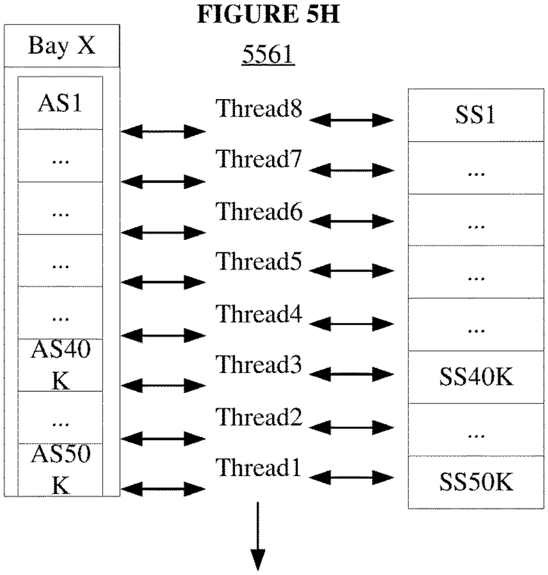
FIG. 5H illustrates another processing arrangement for a SGS that processes a received instruction or inquiry.

In the processing arrangement for a SGS that processes a received instruction or inquiry in FIG. 5H, individual threads refer to the status spaces instead of the individual cores.

Figure 5I:
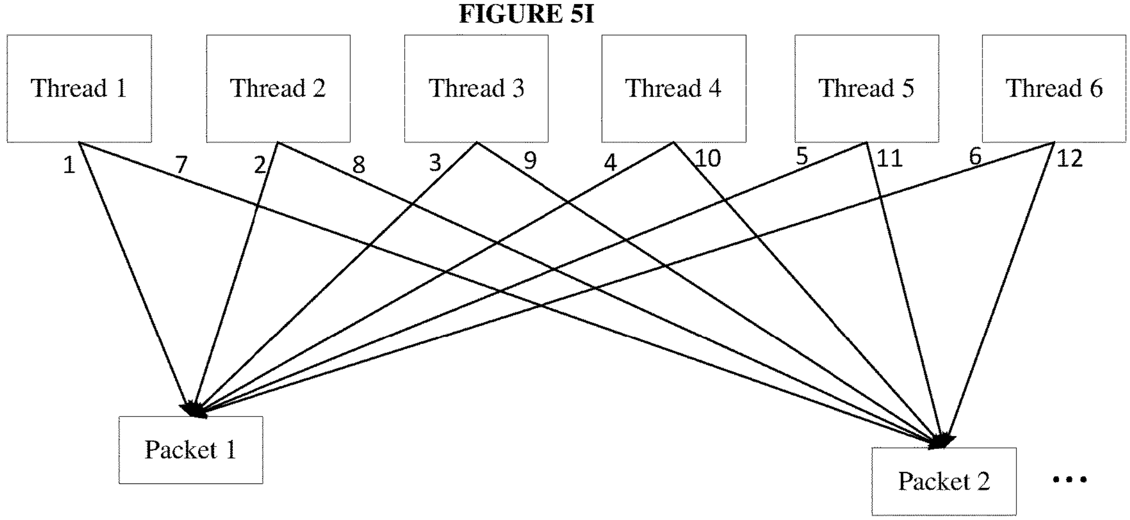
FIG. 5I illustrates a processing order for packets received and stored at a SGS that processes received instructions and inquiries.

In the processing order for packets received and stored at a SGS that processes received instructions and inquiries in FIG. 5I, threads may be assigned in order to process a first packet (i.e., packet #1) and then may be assigned in order to process a second packet (i.e., packet #2). Most or all packets in a bay may be processed in the same order by the same threads, cores, or processors, though some packets may be processed in different orders than other packets if the processing includes branching that allows skipping processing by 1 or more threads, cores, or processors.

Figure 5J:
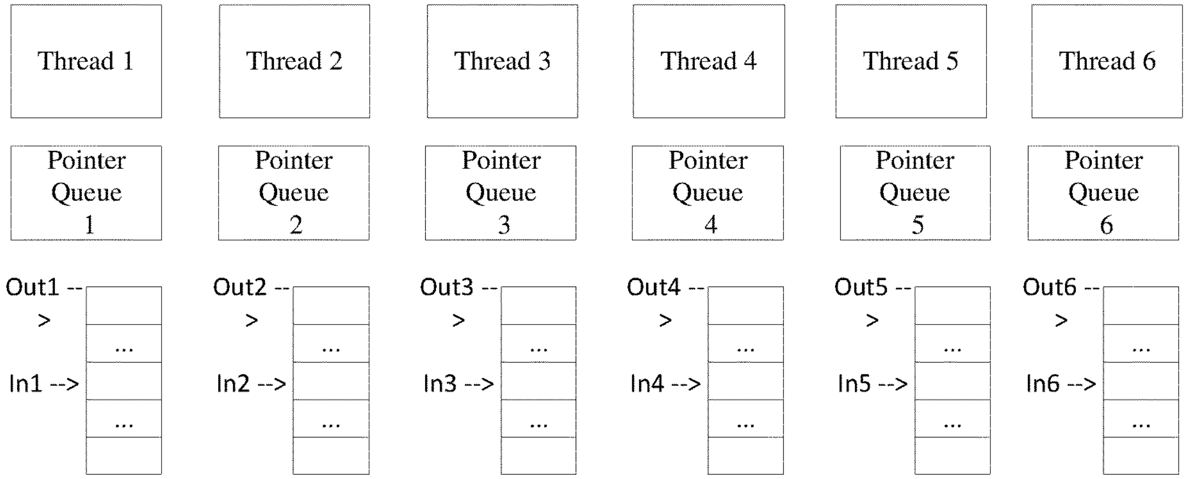
FIG. 5J illustrates use of dedicated queues by processing resources at a SGS that processes received instructions and inquiries.

In the use of dedicated queues by processing resources at a SGS that processes received instructions and inquiries in FIG. 5J, the first in-in first-out pointer queues are shown, wherein address spaces are read out from the top of the existing entries in the queue and address spaces are written to the first open space for entries in the queue. The threads may refer to the address spaces pointed to in the pointer queues, and then retrieve and process the bytes processed by the threads. Each thread may process a subset of the bytes from the packet in the address space, in the manner described herein.

Figure 6A:
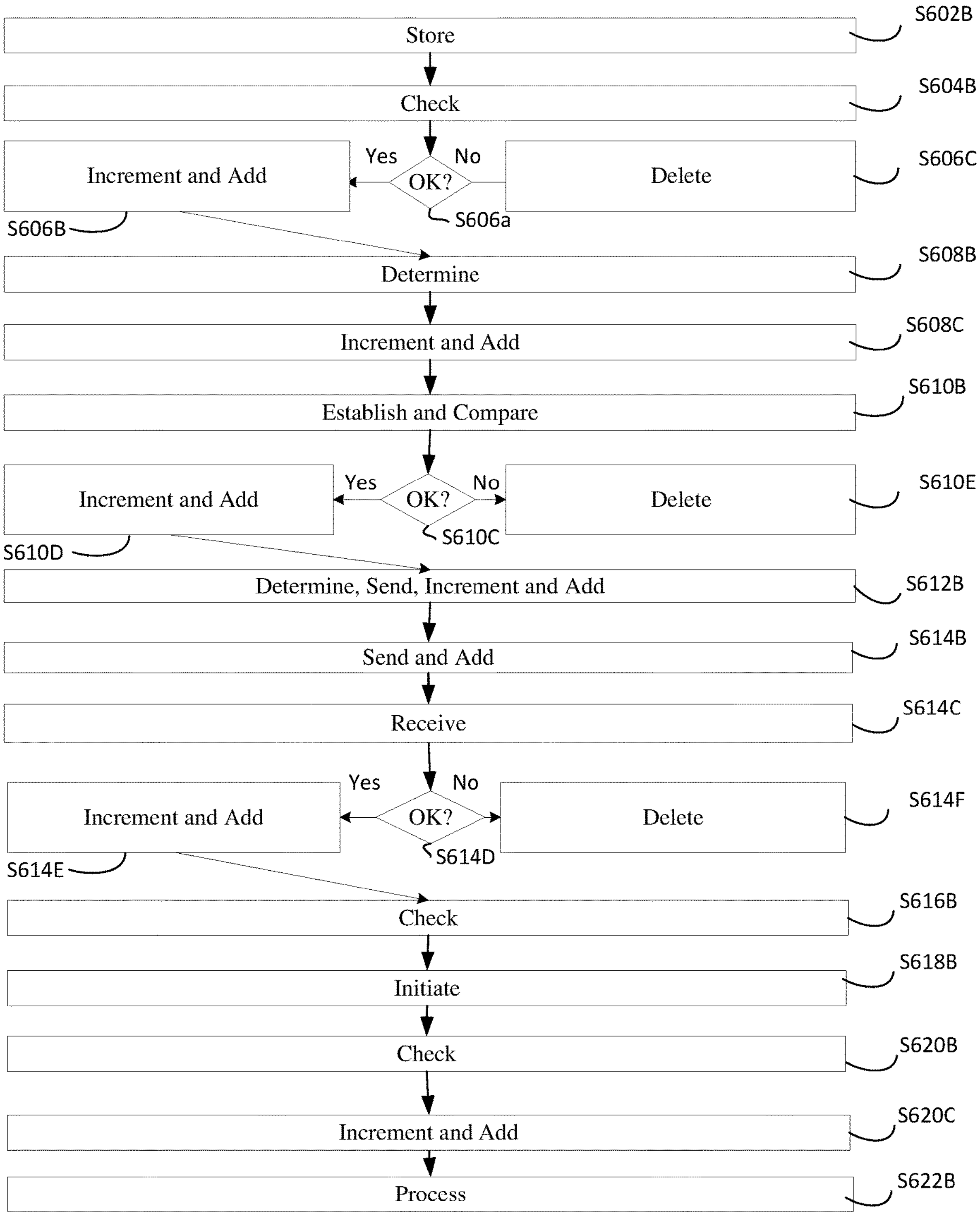
FIG. 6A illustrates a method of a SGS processing a received instruction or inquiry.

In the method of a SGS processing a received SFIOI in FIG. 6A, resources individually and separately process a packet payload in an address space at the SGS 156. Before the method of FIG. 6A starts, packets are received. After all packets in a bay are processed, all address spaces in the bay may be cleared by deleting the data therein.

At S602B, the packet payload is stored in an address space. The header of the packet with the packet payload may also be stored in the address space, and data from both the packet payload and the header may be retrieved and processed by resources. In FIG. 6A, resources iteratively perform their respective process(es) for each address space in a bay of address spaces. The resources may be a thread, processor or core of a multi-core processor. At S604B, the size of the packet payload in bytes is checked by a first resource (i.e., resource 1). The size of the packet payload may be checked by inspecting the presence of meaningful data in the address space, such as by searching for an end pattern used to specify the end of a packet payload and/or reading a packet size field in the header. In some embodiments, the packet size data from the header may be compared with the results of a search for the presence of the meaningful data in the address space. The packet size data and the actual size of the meaningful data in the address space may also be compared with 1 or more predetermined threshold(s), such as a maximum size allowed in a format. At S606A, a determination is made as to whether the checked size is okay. If the checked size is not okay, the packet is deleted from the address space at S606C. If the checked size is okay, the first resource is incremented and the address space for which packet payload size was just checked is added to an address queue for the next resource (i.e., resource #2) at S606B. The next resource will process the address space next. At S608B, the number of VNs purportedly identified in the SFIOI is determined by a second resource (i.e., resource #2). The number may be specified in a field required by a format for the SFIOI, such as by a byte or even fewer than 8 bits. At S608C, the second resource is incremented and the address space just processed by resource #2 is added to an address queue for the next resource (resource 3) which will process the address space. At S610B, an expected size of the packet payload is established from the number of VNs determined at S608B. Since VN identifications should be of uniform sizes, the expected size of a packet payload may be predetermined based on the number of VNs. Additionally, since the number of VNs which can be specified in a packet may be kept at or below a maximum, the potential sizes of packet payloads may also be minimized. At S610B, the expected size is compared to the checked size from 5604B. At S610C, a determination is made whether the comparison at S610B resulted in a match (ok) or not (not ok). If the expected size and the checked size match (S610C=Yes), the third resource is incremented and the address space for which the comparison was just made at S610B is added to an address queue for the next resource (resource 4). If the expected size and the checked size do not match (S610C=No), the packet is deleted at S610E. At S612B, a party identification for a purported owner of a VN and a party identification for a purported counterparty (if any) are determined by the fourth resource, and then sent for aggregate checks by the fourth resource. The fourth resource is incremented, and the address space for which the determination was just made at S612B is added to queue(s) for the next 7 resources (resources 5 through 11). The aggregate checks for owner and counterparty identification are performed by sending an internal inquiry to a separate part of the CS 150, such as to the ID management system 151. The aggregate checks may involve checking to see if the party identification for the purported owner of the VN and the party identification for the purported counterparty (if any) are on a blacklist or greylist. The aggregate checks may be performed in parallel with the remainder of the method of FIG. 6A, so that any results that should prevent execution of a response to an SFIOI at S622B may be received before S622B is performed later. Additionally, the address space is added to queue(s) for the next 7 resources in the example where the maximum number of VNs allowed in a format for instructions and inquires is 7; however, the resources may process more than 1 VN identification, and the maximum number is fewer than 7 or more than 7. At S614B, the purported owner identification and each VN identification are sent separately for ownership checks by the next 7 resources (resources 5 through 11). The ownership checks may be performed by sending internal inquiries to the LSS 152, and may involve simple comparisons of whether the purported owner of a VN matches the listed owner of the VN. The address space for the SFIOI is added to the queue(s) for the next 7 resources (resources 12 through 18). Using another set of resources for responses may maximize efficiency of the resources used in processing at the SGS 156. At S614C, responses to the ownership checks at S614B are received by each of the next 7 resources (resources 12 through 18), and may specify, for example a match or no match for the current owner. Even a single bit may be used to signal a match or no match for an ownership check. The responses at S614C may simply specify the address space for the packet payload being checked and either the relative VN being checked in the packet payload or the resource which made the request at S614B. At S614D, a check is made whether all the ownership inquiries at S614B resulted in a match. If all the ownership inquiries at S614B resulted in a match according to the results received at S614C (S614D=Yes), the twelfth through eighteenth resources are incremented at S614E and the address space is added to the queue for the next resource (i.e., resource 19). If any of the ownership inquiries at S614B did not result in a match (S614D=No), the packet is deleted from the address space at S614F. At S616B, a check is made for stored instructions from the actual owner, if any, by resource 19. The check may be performed by sending an inquiry for any of the VNs to the MMS 153, to look up the actual owner and see if any handling instructions are specified. For example, an owner may specify that no VNs should be transferred from their ownership without using multi-factor authentication, without confirming the transfer in a phone call or email or via another mechanism, or another type of special handling. After sending the inquiry, resource 19 may increment and add the address space to a queue for the next resource (i.e., resource 20). In some embodiments, owner instructions for VNs may be stored at the LSS 152, or another system (not shown) that is provided in parallel to the LSS 152 but which stores cursory information for owners as to any special instructions for handling VNs they own. At S618B, the twentieth resource initiates anti-spoofing measures, if indicated by the response to the inquiry by the nineteenth resource from S616B. Anti-spoofing may be performed by initiating a multi-factor authentication check, and then having another resource (not shown in FIG. 6A) wait for the authentication. After the anti-spoofing check, the resource(s) performing the anti-spoofing check increment and add the address space for the resource to the queue(s) for the next resources. At S620B, the next resource (i.e., resource 21) checks the type of the SFIOI. The type may be specified in a field required by the format for the SFIOI, such as a full byte or even 2 or 3 bits. Because the tracking described herein may be expanded to many other uses, a "type" field may include a full byte so that up to 256 different types may eventually be specified using the same format, even though only relatively few types are used for the digital currency tracking described herein. At S620C, resource 21 is incremented, and the address space for the packet is added to the queues for the next resources which actually process the SFIOI. The number of resources which process the SFIOI may vary based on how many different types of different actions can be performed based on an SFIOI. At S622B, the SFIOI is processed by one or more of the next resources (resources 22+). Processing may include sending an instruction to update ownership and owner records at the MMS 153 and confirming a transfer instruction to the source, or simply confirming an ownership inquiry to the source. The confirmation of any ownership inquiry may be made by default without any further inquiries here since ownership was checked at S614B and the SFIOI would have been answered already or deleted if the ownership inquiry had 1 or more negative results. Other types of processing may include updating handling instructions, or transferring ownership records to reflect that an owner has moved specific VNs between custodial accounts or devices.

Figure 6B:
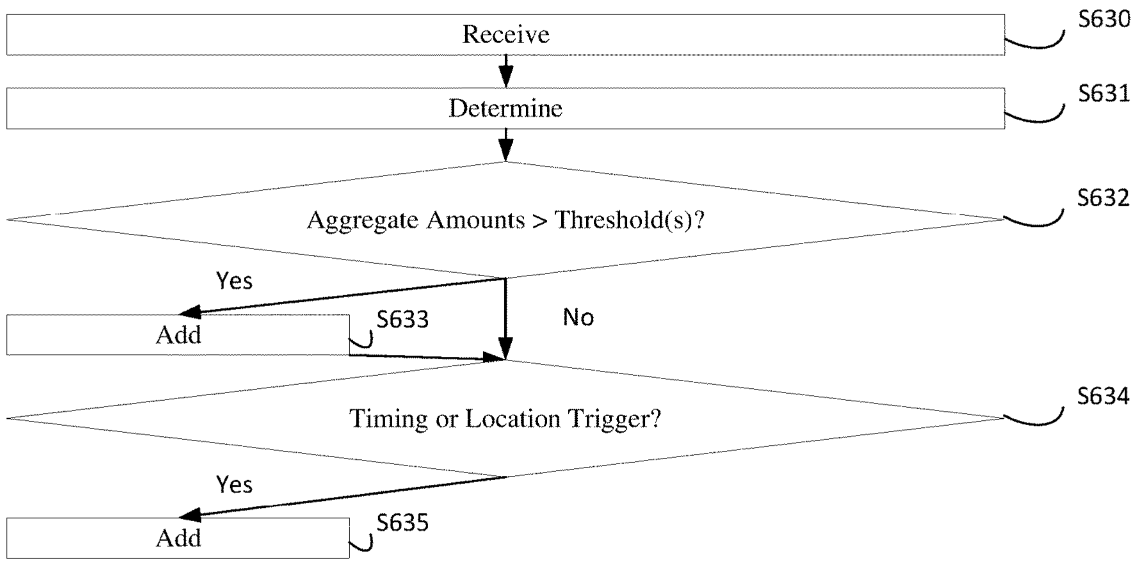
FIG. 6B illustrates a method for aggregate security checks at a memory system of a CS.

In the method for aggregate security checks at a memory system of a central system in FIG. 6B, the method may be performed at or by the MMS 153, at or by the AI and analytics system 154, or at another element of the CS 150. The method may be performed in order to check patterns for an initiating party and/or a counterparty in any transfer, such as to see if an account is being drained suspiciously or is being filled suspiciously. Since suspicions may be relative for different people, places and times, different thresholds and analytics may be applied to look for different patterns. At S630, a record update for transferred VNs is received. The record update may be stored both in the histories for the VNs and in the histories of the initiating party and the counterparty. Different algorithms may be applied to the histories for the VNs and the histories of the initiating party to check for different characteristics of patterns. At S631, aggregate amounts for the transferee and transferor for recent period(s) are determined. The aggregate amounts may be total amounts transferred to or from the transferee and transferor in the past 60 seconds, 5 minutes, 30 minutes, 1 hour, 24 hours and/or other amounts of time. At S632, the aggregate amounts are compared to thresholds to see if the aggregate amounts are higher than the thresholds. If 1 or more of the aggregate amounts is higher than the corresponding threshold(s) (S632=Yes), the corresponding party may be added to a blacklist or greylist at S633. If no aggregate amount is higher than the corresponding threshold (S632=No), additional checks may be performed. At S634, another check may involve a timing trigger or location trigger. For example, transfers from a party to an internet protocol address in a dangerous region may trigger an addition to a blacklist or greylist. As another example, transfers from a party at 2:00 AM local time may trigger an addition to a blacklist or greylist. At S3635, the party is added to the blacklist or greylist if the timing or location generates a trigger (S634=Yes), and otherwise the process of FIG. 6B ends.

Figure 6C:
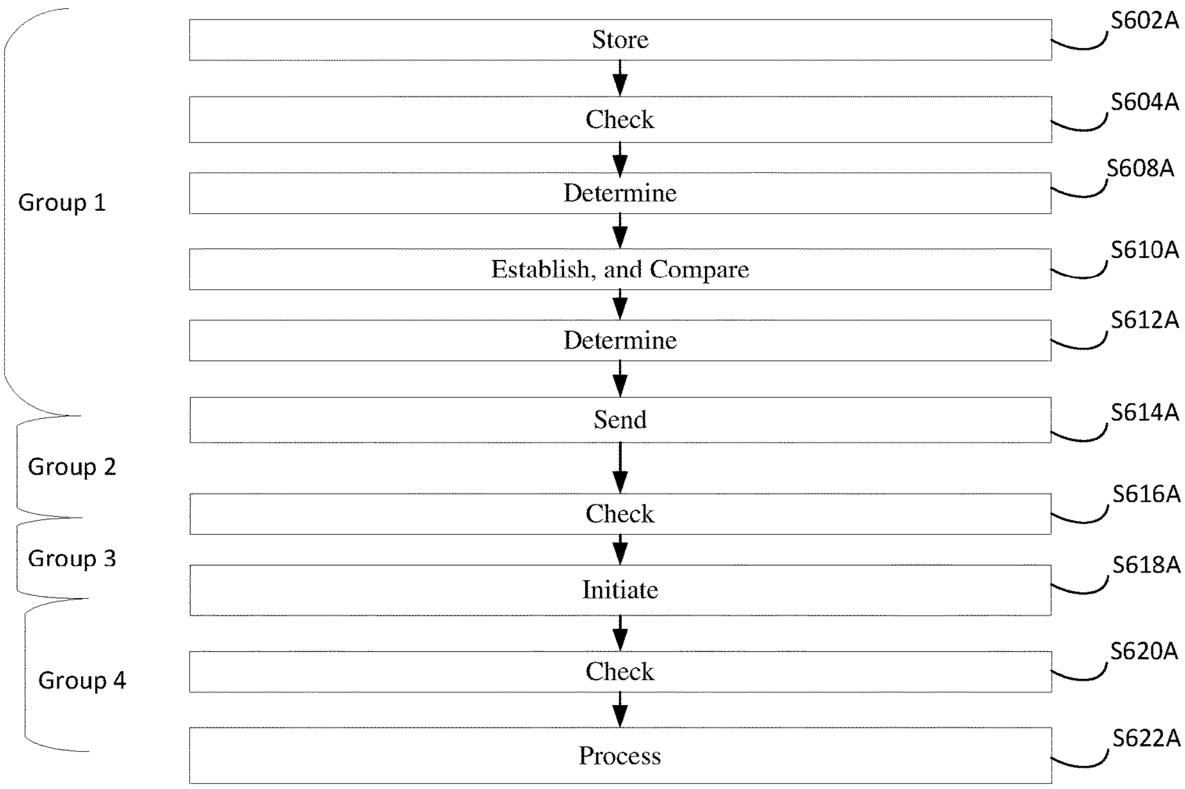
FIG. 6C illustrates a method of a SGS processing a received instruction or inquiry.

In the method of a SGS processing a received instruction or inquiry in FIG. 6C, the method of FIG. 6A is broken up into 4 sections as an example of how different graphics cards or groups of processors in one or more graphics cards may be assigned to different tasks in a SGS. Graphics cards may include numerous processors that operate largely in parallel. Tasks performed at the SGS will be inherently performed in parallel for different received packets. As long as the processing provided by graphics cards can be properly applied to SFIOIs, graphics cards may be used. In FIG. 6C, the processors are broken up into 4 groups. The processing of each group may end when an inquiry is sent to a separate internal system, since one of the simplest, if not the simplest, ways to ensure efficient processing is to not have any processors specifically waiting for an answer to an inquiry they sent out, and not having to route answers back to specific processors that sent an inquiry. The use of status spaces can ensure that each address space is efficiently processed. As an example, 3200 processors in a graphics card may be divided into 4 groups of 800 processors. The processors may process address spaces 800 at a time. The parallel aspect of the processing that leverages graphics cards results from applying the groups to different groups of address spaces simultaneously, so that a first group may be processing address spaces 2401-3200, the second group may be processing address spaces 1601-2400, the third group may be processing address spaces 801-1600, and the fourth group may be processing address spaces 001-800. Processors in each group may increment 800 address spaces at a time once completed with their current processing. Of course, groups of processors do not all have to have the same number of processors, such as if the tasks performed by one group can be performed faster than tasks performed by another group. Rather, in order to enhance relative continuity in processing, sets of 1 or more first tasks that require more processing time than sets of 1 or more second tasks may be assigned to a first group of processors that includes more processors than a second group of processors that perform the sets of 1 or more second tasks.

In the memory arrangement for a SGS that processes a received instruction or inquiry in FIG. 6D, a SGS includes a variety of electronic components including a SFIOI memory 6561 and a status memory 6562 which is physically separate from the SFIOI memory 6561. The SFIOI memory is expected to store SFIOIs on a one-to-one basis, such as one SFIOI per page of 512 bytes, or a basis of one SFIOI per multiples or fractions of a page of 512 bytes. The status memory 6562 is expected to store status updates as processors, cores or threads process the SFIOI in the SFIOI memory. One aspect of technological concerns that is addressed in this disclosure is the program/erase cycles of the SGS 156. Status updates may require writing 2 or more status updates to the status memory 6562 for each SFIOI written to the SFIOI memory 6561. However, since writes to the status memory 6562 may be limited to a byte or a word at each instance, each potential status update may be written to a different byte or word of the status memory 6562. In this way, a thread may first read the status memory 6562 to determine if the prerequisite processing has been performed by referencing the statuses of bytes or words that have already been updated. As a simple example, a thread #7 may check the status of byte #6 which is updated by thread #6, and if the status shows that thread #6 has already processed the SFIOI, thread #7 may then read whichever portion of the SFIOI is processed by thread #7. When thread #7 is finished with processing the SFIOI, thread #7 may update byte #7 in the status memory to show that thread #7 has completed its processing of the SFIOI. A SFIOI memory 6561 may include multiple memories such as a first SFIOI memory 6561-1, a second SFIOI memory 6561-2, and so on through a forty-thousandth SFIOI memory 6561-3. A status memory 6562 may include multiple memories such as a first status memory 6562-1, a second status memory 6562-2, and so on through a forty-thousandth status memory 6562-3. Each processor, core or thread performs a specific process on SFIOIs in the SFIOI memory 6561, after first checking the corresponding status in the status memory 6562 and before updating the corresponding status in the status memory 6562. The SFIOI memory 6561 may be a first bay in the SGS 156 and may be assigned incoming SFIOIs for a minute as an example. A second bay in the SGS 156 may be substantially identical to the first bay, and may be assigned incoming SFIOIs for the next minute in this example timing. The cycling through bays may be performed periodically, such as every 5, 10, 15, 30 or 60 minutes. Moreover, while a bay may be assigned SFIOS for processing on a fixed timeframe, this is not particularly likely to be the best practice. Rather, load balancing and other types of practices may be implemented on a dynamic basis so that the SFIOI memories and status memories may be reinforced with additional physical resources when appropriate. In FIG. 6D, a status memory 6562 is physically separate from a SFIOI memory 6561, such that a processor, core or thread switches back and forth between the two in processing. However, individual processors, cores or threads operate by processing only specific portions of a SFIOI rather than the entirety of the SFIOI in the SFIOI memory 6561, and by checking and writing to only individual bytes or words in the status memory 6562

In the memory arrangement for a SGS that processes a received SFIOI in FIG. 6E, memory management involves using a combined SFIOI and status memory 6563 for the memory space for SFIOIs and the memory space for statuses at a SGS 156. In other words, the combined SFIOI and status memory 6563 includes a first area for storing the SFIOI and a second area used for tracking the status of processing of the SFIOI. For example, a SFIOI format may require that notifications to a central system be exactly 256 bytes, and may limit the number of VNs specified in a SFIOI to 7 or 13 or another number that can be separately specified by 256 bytes of a SFIOI even if each VN is specified in a separate 64-bit word. Another 256 bytes of a page may be reserved for specific use in processing by processors, cores, or threads of the SGS 156. For example, if a 512-byte page can store up to 64 64-bit words and 32 of the 64-bit words are reserved for the SFIOI, then memory starting at the 33rd word line of the combined SFIOI and status memory 6563 may be used for statuses. Statuses may be updated by writing at a byte level or at a word level. For example, the default statuses in the status space may be set to 0 (zero), and may be updated to 1 (one) in a status update, so that bytes or words in the status spaces in the combined SFIOI and status memory 6563 may be written to 1 at one or more bit positions when the corresponding processing is complete. Therefore, during processing of a SFIOI, a processor, core or thread may read statuses at or after the 33rd word line of the combined SFIOI and status memory 6563 before processing a specific part of the SFIOI and then updating another part of the status space. The processors, cores or threads may be organized to efficiently use the memory pages of the SGS 156 so that each single physical memory page is logically partitioned. Of course, the partition does not have do be exactly one-half of the total space of a memory page or other predefined addressable memory unit. For example, in the case of a 512-byte page of memory, SFIOI formats may require 384 bytes, and 128 bytes may be used for status updates during processing. As should be evident, the most efficient way to perform processing for SFIOIs may be to use predefined memory units that are as large or larger than the size of each SFIOI and whatever memory space is required for the status updates for each SFIOI. This way, SFIOIs may be stored on a 1-to-1 basis in a predefined and addressable memory space.

In some embodiments, the format for SFIOIs may be set to the size of an addressable memory space such as a 512-byte page of flash memory, and some of the words at the end of the format may be set to null values and not written to the addressable memory space. Instead, the addressable memory space corresponding to the words at the end of the format is not written to with the SFIOI, and is instead used for the status tracking and updating described herein. In the example format for a SFIOI in FIG. 6F, 64 64-bit words are shown, though each row in FIG. 6F includes 64 bytes of for example, a 512-byte format. The first 24 bytes are used for the header, and additional fields are used for the VN count, the VN origin ID, a first party ID, a second party ID, sixteen VN ID fields, an a SFIOI type field. The first party ID may correspond to a purported owner, such as in every instance of a SFIOI, and this may correspond to a transaction requester or requester ID in transactions. The first party ID may be the only ID specified if the SFIOI is to update handling instructions for the owner at the CS 150. The second party ID may be for counterparties or counterparty ID in transactions, and may sometimes not be populated such as when the SFIOI is not for a transaction. VN IDs may include a first byte for country/region code, a second byte for denomination when denominations are limited to 256 or fewer values, and six more bytes for the actual unique ID for that denomination issued by that country/region. The SFIOIs may each be subject to the same processing regardless of the type of SFIOI, since the processing may include a variety of security checks. The security checks may be performed before processing the type of processing requested/instructed by the SFIOI. Although not shown, a notifier type field may indicate whether the notification is being made by a transaction requesting party or a transaction counterparty when either may make the notification. Notifier type may also indicate whether the notifier is a trusted system that is trusted by the CS 150 to make notifications as a transaction requesting party and as a transaction counterparty, such as when the notifier is a private bank subject to oversight and regulation by a central bank that provides the CS 150. An example format size for a SFIOI is 512 bytes. The format for a SFIOI may start each new field every 64 bits for uniform reading as 64 bit word lines by a 64 bit processor, so that each field may include 64 bits so long as the data therein can be meaningfully specified in 64 or fewer bits. Remaining bits in a 64 bit/8 byte field may be uniformly set to 0 or 1.

In some embodiments, the VN ID may be provided as part of VN_info sent to the CS 150. The VN_info may include a unique identification and a denomination, and may be provided as more than the 8 bytes shown in FIG. 6D. The VN_info may also include creation dates/times and/or locations. The VN_info may be or include an encrypted version of the unique identification extracted from a metadata field of the VN or provided along with but separate from the VN from when the CS 150 first issues the VN. The CS 150 may decrypt the encrypted version of the unique identification.

Though the header shown in FIG. 6F includes 24 bytes (e.g., with the last 4 bytes being empty), a header for an IPv6 packet normally is assigned 40 bytes given a larger IP addressing scheme. The format for SFIOIs should be large enough to include the header information and the amount of payload information expected by the provider of the central systems described herein.

The final fields of the SFIOI are empty, and are reserved for the status updates at the SGS 156. Two words of 16 bytes total may be enough to track statuses of 16 security checks, three words of 24 bytes total may be enough to track statuses of 24 security checks, and so on. So long as the number of VNs allowed in a packet is maintained at or under a maximum limit, even a 256-byte format for a SFIOI may be appropriate to handle processing at the SGS 156, though the present disclosure primarily uses the example of a 512-byte format. Of course, other sizes for formats for a SFIOI may be logically appropriate, such as if other types of predefined memory sizes and arrangements are being used at a SGS 156. For example, SFIOIs may be allowed to have different sizes and may be tracked sequentially once received at the SGS 156. However, ad-hoc sizes for SFIOIs are not optimal, and the best mode for implementing such SFIOIs is to specify a format that leverages network packetization, standard predefined memory sizes for ubiquitous memory types such as flash memory, standard instruction sizes for modern processors such as by using 64-bit words, and so on.

In some embodiments, another field for a SFIOI may also specify the total amount involved in a transaction, the amount of change (i.e., less than a $1.00 amount) involved in a transaction, or another amount. For example, in the event that small denominations are not issued for VNs or are otherwise not tracked by a central system, a SFIOI may still specify the amount of change to be credited and/or debited from accounts corresponding to the parties, depending on whether the SFIOI is specifying a transfer in a transaction. In this way, the format for SFIOIs may still accommodate transfers involving denominations which are not issued as VNs, or which are not otherwise tracked by the central system. As an example, if a party is paying $50.00 for an item in a transaction and expects 65 cents in change, the change may be automatically credited to the party's associated account and debited from the seller's associated account. The associated accounts may be maintained outside of the central system, so that the associated accounts are maintained by the financial institutions which provide the accounts as a service. The central system may simply notify the ID management system 151 or another node which maintains ID records for parties to initiate a debit or credit with the financial institutions. In some embodiments, parties registered with a central system may be required to have an associated account, though a government and/or central bank may facilitate accounts (e.g., by providing incentives to financial institutions) for the segments of populations who do not already have such accounts. For example, a government and/or central bank may pay the financial institutions to eliminate minimum balance or spending requirements, or may provide a form of insurance for any losses that would be incurred by the financial institutions in the event of fraud etc. Alternatively, the CS 150 may store information of third party (e.g., bank) accounts for senders and recipients of VNs, and may credit and/or debit the third party accounts for amounts of change agreed to in notifications from senders and recipients. In some embodiments, CS 150 may use universal EWPs as a default for crediting and debiting senders and recipients, but senders and recipients may be allowed to update the CS 150 to specify third party accounts to use instead of the universal EWPs.

One benefit of providing ample room for modifications to requirements for formatted SFIOIs is that the technology described herein may be used for many other purposes. For example, if central systems reserve 32 or 64 "types" in the SFIOI type field, private systems may use the same type of format to track other types of transactions, such as mortgages or other types of loans, real estate transfers, cars, and so on.

SFIOI formats may vary from what is taught herein while still being consistent with the intent and teachings herein. For example, the order of fields may vary, more fields or less fields than shown may be specified in a format, blank fields and blank spaces may vary, so long as the format is clear from the start so that parties worldwide can appropriately program end user devices, intermediate user devices and central system devices consistent with whatever the format is.

Additionally, the format for a SFIOI shown in FIG. 6F is independent of the format for VNs. So long as VNs are provided with unique identifications, the format of a SFIOI such as the format in FIG. 6F may be used to track the VNs.

Financial institutions and other types of organizations may also be provided an ability to issue the party IDs described herein. For example, a financial institution may be provided a unique identification with 4 or 5 digits, such that the unique identification can be stated in two or three bytes. The financial institution may use its unique identification as the first two or three bytes of a full identification assigned as a party ID. Party IDs may then be something like three bytes, four bytes or five bytes for the party and two or three bytes for the financial institution. In this way, the central systems may not be required to store any identifying information of a party, and instead may rely on the financial institutions to know who the party IDs correspond to. At least in the United States, financial institutions may store party IDs and then simply require a warrant in the event that a governmental entity wants to know who the party ID corresponds to. Other types of organizations that may be allowed to issue unique identifications for customers may include entities such as Coinbase, Facebook, or other entities with large customer bases, so long as the customer bases include customers who actually trust such entities to maintain their privacy to the extent possible or even just reasonable. As an example, a central system may provide a unique ID for a party to a bank without even sending an account identification, and let the bank determine which associated account the VNs are to be credited to based on the unique ID for the party.

In some embodiments, CS 150 may accept several different types of SFIOIs, For example, a format type may be listed at the beginning of the incoming communications. The CS 150 may read the format type first (rather than towards the end of processing), so as to begin processing using an algorithm appropriate for the format type. Different algorithms may be applied to different types of SFIOIs, similar to how different processing is performed for different types of SFIOIs when the SFIOI type is processed after security checks. However, format types acceptable to a CS 150 may be fewer or greater than six without departing from the scope of the present disclosure. Different types may include ownership inquiries, transfer instructions In some embodiments, parties trusted by the CS 150 may correspond to specific party IDs, and this may be used to eliminate some forms of security processing. In other embodiments, trusted parties may have dedicated communication links to the CS 150. In some embodiments, large entities that provide their own secure environments to customers (e.g., Apple, Google, JP Morgan) may be allowed to co-locate one or more servers at a data center used by the CS 150, so that their customers can send SFIOIs over the secure environments of the entities and then directly have the unpackaged SFIOIs input to the SGS 156.

In the descriptions herein, blockchain is not necessarily used to implement a digital currency. However, the use of blockchains is also not particularly prohibited, and may be useful for some circumstances. For example, recording transactions involving large amounts of VNs on a blockchain with individual ledgers of the distributed ledger at each of a group of cooperating central banks may be useful to resolve disagreements between the central banks as to the details of previous transactions. A group of users of a particular digital currency may also agree to record transactions involving VNs on a blockchain. Therefore, even if central systems herein are not particularly part of a blockchain for implementing a digital currency, the use of blockchains is not specifically prohibited or incompatible.

Additionally, the use of encryption has been described for specific embodiments and purposes herein. However, the use of encryption mechanisms such as SSL may be assumed for transmission of VNs in most or perhaps all communications. To the extent that different mechanisms for encryption may be used for handling of VNs, the teachings herein should not be considered particularly inconsistent with use of any particular encryption in appropriate circumstances.

Although centralized tracking for digital currencies has been described with respect to VNs, the teachings herein are not limited in applicability to VNs or any particular digital currency authorized by a government or issued by or on behalf of a central bank. Rather, various aspects of the teachings herein may be implemented for other forms digital currencies including stablecoins and other forms of cryptocurrencies, as well as other forms of digital tokens that are used as mediums of value, including digital currencies that do not share one or more characteristics of VNs as described herein.

Although centralized tracking for digital currencies has been described with reference to several exemplary embodiments, it is understood that the words that have been used are words of description and illustration, rather than words of limitation. Changes may be made within the purview of the appended claims, as presently stated, and as amended, without departing from the scope and spirit of centralized tracking for digital currencies in its aspects. Although centralized tracking for digital currencies has been described with reference to particular means, materials and embodiments, centralized tracking for digital currencies is not intended to be limited to the particulars disclosed; rather centralized tracking for digital currencies extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. For example, insofar as a legal framework for implementing digital currencies is not yet in place in the United States or Europe, standards compliant with such legal standards may be developed in the future and are expected to implement one or more of the mechanisms described herein.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A centralized tracking system, comprising:

a security gateway system that interfaces with the public over the internet, that comprises a memory that stores packets received over the internet and a processor that executes at least one algorithm to process the packets stored in the memory, wherein the packets are required to conform to a format that specifies requirements for fields at predetermined relative locations of payloads of acceptable packets, and each algorithm processes packets stored in the memory by checking data in the fields at the predetermined relative locations of the payloads of the packets for compliance with the format; and a main memory system that is remote from the security gateway system, that stores records of all instances of a tracked digital asset for the centralized tracking system, and that receives updates to the records once acceptable packets stored in the memory pass processing by the at least one algorithm, wherein the centralized tracking system is configured to update the records of instances of the tracked digital asset listed in the acceptable packets to transfer ownership of the instances of the tracked digital asset listed in the acceptable packets when checking data from a specified field at a predetermined relative location of the payloads of the acceptable packets after the at least one algorithm processes the acceptable packets for compliance with the format and the data from the specified field at the predetermined relative location of the payloads of the acceptable packets indicates to update the records of the instances of the tracked digital asset listed in the acceptable packets, and wherein the centralized tracking system is configured to proactively confirm ownership of the instances of the tracked digital asset listed in the acceptable packets without transferring ownership of the instances of the tracked digital asset listed in the acceptable packets when checking the data from the specified field at the predetermined relative location of the payloads of the acceptable packets after the at least one algorithm processes the acceptable packets for compliance with the format and the data from the specified field at the predetermined relative location of the payloads of the acceptable packets indicates to confirm ownership of the instances of the tracked digital asset listed in the acceptable packets without transferring ownership of the instances of the tracked digital asset listed in the acceptable packets.

2. The centralized tracking system of claim 1, further comprising:

a ledger storage system that is shielded from the public by the security gateway system by being directly inaccessible to the public, that stores records of current ownership of instances of the tracked digital asset, and that confirms whether ownership listed in packets that pass processing by the at least one algorithm is correct for each tracked digital asset listed in the packets.

3. The centralized tracking system of claim 2, wherein the ledger storage system is configured to proactively confirm ownership of each tracked digital asset included in the packets that pass processing by the at least one algorithm.

4. The centralized tracking system of claim 1, further comprising:

an identification management system that stores identification numbers for parties, wherein at least some of the identification numbers are generated by third-party systems for parties who are anonymous to the centralized tracking system.

5. The centralized tracking system of claim 1, wherein the at least one algorithm comprises a plurality of algorithms that send inquiries outside of the security gateway system but within the centralized tracking system.

6. The centralized tracking system of claim 1, wherein the packets received at the security gateway system are filtered to ensure compliance with the format, and wherein the format sets a size requirement for the packets, sets a formatting requirement for party identifications included in the packets, and sets a formatting requirement for unique identifications of instances of the tracked digital asset included in the packets.

7. The centralized tracking system of claim 1, wherein the at least one algorithm comprises a plurality of algorithms, and wherein the packets are stored in memory units of a uniform size in the memory at the security gateway system.

8. A method for centralized tracking, comprising:

interfacing a security gateway system of a centralized tracking system with the public over the internet, the security gateway system comprising a memory that stores packets received over the internet and a processor that executes at least one algorithm to process the packets stored in the memory, wherein the packets are required to conform to a format that specifies requirements for fields at predetermined relative locations of payloads of acceptable packets, and each algorithm processes packets stored in the memory by checking data in the fields at the predetermined relative locations of the payloads of the packets for compliance with the format;

shielding a main memory system from the public by the security gateway system by placing the main memory system remote from the security gateway system;

storing records of all instances of a tracked digital asset for the centralized tracking system in the main memory system;

receiving, at the main memory system, updates to the records once acceptable packets stored in the memory pass processing by the at least one algorithm;

updating the records of instances of the tracked digital asset listed in the acceptable packets to transfer ownership of the instances of the tracked digital asset listed in the acceptable packets when checking data from a specified field at a predetermined relative location of the payloads of the acceptable packets after the at least one algorithm processes the acceptable packets for compliance with the format and the data from the specified field at the predetermined relative location of the payloads of the acceptable packets indicates to update the records of the instances of the tracked digital asset listed in the acceptable packets, and proactively confirming ownership of the instances of the tracked digital asset listed in the acceptable packets without transferring ownership of the instances of the tracked digital asset listed in the acceptable packets when checking the data from the specified field at the predetermined relative location of the payloads of the acceptable packets after the at least one algorithm processes the acceptable packets for compliance with the format and the data from the specified field at the predetermined relative location of the payloads of the acceptable packets indicates to confirm ownership of the instances of the tracked digital asset listed in the acceptable packets without transferring ownership of the instances of the tracked digital asset listed in the acceptable packets.

9. The method of claim 8, further comprising:

shielding a ledger storage system from the public by the security gateway system by being directly inaccessible to the public; and storing, at the ledger storage system, records of current ownership of instances of the tracked digital asset, and confirming whether ownership listed in packets that pass processing by the at least one algorithm is correct for each tracked digital asset listed in the packet.

10. The method of claim 9, further comprising:

proactively confirming, by the ledger storage system, ownership of each tracked digital asset included the packets that pass processing by the at least one algorithm.

11. The method of claim 8, further comprising:

storing, by an identification management system, identification numbers for parties, wherein at least some of the identification numbers are generated by third-party systems for parties who are anonymous to the centralized tracking system.

12. The method of claim 8, wherein the at least one algorithm comprises a plurality of algorithms, and the method further comprising:

sending, by the plurality of algorithms at the security gateway system, inquiries outside of the security gateway system but within the centralized tracking system.

13. The method of claim 8, further comprising:

filtering the packets received at the security gateway system to ensure compliance with the format, wherein the format sets a size requirement for the packets, sets a formatting requirement for party identifications included in the packets, and sets a formatting requirement for unique identifications of instances of the tracked digital asset included in the packets.

14. The method of claim 8, wherein the at least one algorithm comprises a plurality of algorithms, and wherein the packets are stored on in memory units of a uniform size in the memory at the security gateway system.

15. The centralized tracking system of claim 1, wherein the packets received from the public are limited to individual, non-sequenced packets.

* * * * *